US012513657B2

(12) United States Patent
Bao et al.

(10) Patent No.: US 12,513,657 B2
(45) Date of Patent: Dec. 30, 2025

(54) CARRIER PHASE MEASUREMENT ERROR INFORMATION ASSOCIATED WITH POSITION ESTIMATION OF A USER EQUIPMENT

(71) Applicant: QUALCOMM Incorporated, San Diego, CA (US)

(72) Inventors: Jingchao Bao, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 342 days.

(21) Appl. No.: 18/315,812

(22) Filed: May 11, 2023

(65) Prior Publication Data

US 2024/0381299 A1   Nov. 14, 2024

(51) Int. Cl.
*H04W 64/00* (2009.01)
*H04L 5/00* (2006.01)
*H04W 56/00* (2009.01)

(52) U.S. Cl.
CPC ......... *H04W 64/003* (2013.01); *H04L 5/0048* (2013.01); *H04W 56/0055* (2013.01)

(58) Field of Classification Search
CPC ............ H04W 64/003; H04W 56/0055; H04L 5/0048; H04L 5/0051; G01S 5/10
See application file for complete search history.

(56) References Cited

U.S. PATENT DOCUMENTS 11,353,542 B2 *   6/2022   Da ..................... H04L 5/0005
2019/0253282 A1 * 8/2019   Hadaschik .......... H04L 25/022

FOREIGN PATENT DOCUMENTS

CN   114787660 A   7/2022
EP     4175327 A1   5/2023

OTHER PUBLICATIONS

Interdigital Inc: "Discussion on Integrity for RAT Dependent Positioning Techniques", 3GPP TSG RAN WG1 #111, R1-2211726, 3rd Generation Partnership Project, Mobile Competence Centre, 650, Route Des Lucioles, F-06921 Sophia-Antipolis Cedex, France, vol. 3GPP Ran 1, No. Toulouse, France, Nov. 14, 2022-Nov. 18, 2022, 12 Pages, Nov. 7, 2022, XP052222291, Section 2.
International Search Report and Written Opinion—PCT/US2024/028258—ISA/EPO—Sep. 4, 2024.

* cited by examiner

*Primary Examiner* — Kabir A Timory
(74) *Attorney, Agent, or Firm* — Muncy, Geissler, Olds & Lowe, P.C.

(57) ABSTRACT

Aspects are directed to a wireless measurement entity that performs a carrier phase measurement associated with a reference signal for positioning (RS-P) measurement for a position estimation of a user equipment (UE). The wireless measurement entity determines error information associated with the carrier phase measurement. The wireless measurement entity transmits the RS-P measurement to a position estimation entity, and further transmits the carrier phase measurement and an indication of the error information to the position estimation entity. The position estimation entity determines a position estimate of the UE based on the RS-P measurement, the carrier phase measurement, and the indication of the error information.

15 Claims, 21 Drawing Sheets

CARRIER PHASE MEASUREMENT ERROR INFORMATION ASSOCIATED WITH POSITION ESTIMATION OF A USER EQUIPMENT

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a wireless measurement entity includes performing a carrier phase measurement associated with a reference signal for positioning (RS-P) measurement for a position estimation of a user equipment (UE); determining error information associated with the carrier phase measurement; transmitting the RS-P measurement to a position estimation entity; and transmitting the carrier phase measurement and an indication of the error information to the position estimation entity.

In an aspect, a method of operating a position estimation entity includes receiving a reference signal for positioning (RS-P) measurement for a position estimation of a user equipment (UE); receiving a carrier phase measurement associated with the RS-P measurement and an indication of error information associated with the carrier phase measurement; and determining a position estimation of the UE based on the RS-P measurement, the carrier phase measurement, and the indication of the error information.

In an aspect, a wireless measurement entity includes at least one memory; and at least one processor communicatively coupled to the at least one memory, the at least one processor configured to: perform a carrier phase measurement associated with a reference signal for positioning (RS-P) measurement for a position estimation of a user equipment (UE); determine error information associated with the carrier phase measurement; transmit the RS-P measurement to a position estimation entity; and transmit the carrier phase measurement and an indication of the error information to the position estimation entity.

In an aspect, a position estimation entity includes at least one memory; and at least one processor communicatively coupled to the at least one memory, the at least one processor configured to: receive a reference signal for positioning (RS-P) measurement for a position estimation of a user equipment (UE); receive a carrier phase measurement associated with the RS-P measurement and an indication of error information associated with the carrier phase measurement; and determine a position estimation of the UE based on the RS-P measurement, the carrier phase measurement, and the indication of the error information.

In an aspect, a wireless measurement entity includes means for performing a carrier phase measurement associated with a reference signal for positioning (RS-P) measurement for a position estimation of a user equipment (UE); means for determining error information associated with the carrier phase measurement; means for transmitting the RS-P measurement to a position estimation entity; and means for transmitting the carrier phase measurement and an indication of the error information to the position estimation entity.

In an aspect, a position estimation entity includes means for receiving a reference signal for positioning (RS-P) measurement for a position estimation of a user equipment (UE); means for receiving a carrier phase measurement associated with the RS-P measurement and an indication of error information associated with the carrier phase measurement; and means for determining a position estimation of the UE based on the RS-P measurement, the carrier phase measurement, and the indication of the error information.

In an aspect, a non-transitory computer-readable medium storing computer-executable instructions that, when executed by a wireless measurement entity, cause the wireless measurement entity to: perform a carrier phase measurement associated with a reference signal for positioning (RS-P) measurement for a position estimation of a user equipment (UE); determine error information associated with the carrier phase measurement; transmit the RS-P measurement to a position estimation entity; and transmit the carrier phase measurement and an indication of the error information to the position estimation entity.

In an aspect, a non-transitory computer-readable medium storing computer-executable instructions that, when executed by a position estimation entity, cause the position estimation entity to: receive a reference signal for positioning (RS-P) measurement for a position estimation of a user equipment (UE); receive a carrier phase measurement associated with the RS-P measurement and an indication of error information associated with the carrier phase measurement; and determine a position estimation of the UE based on the RS-P measurement, the carrier phase measurement, and the indication of the error information.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
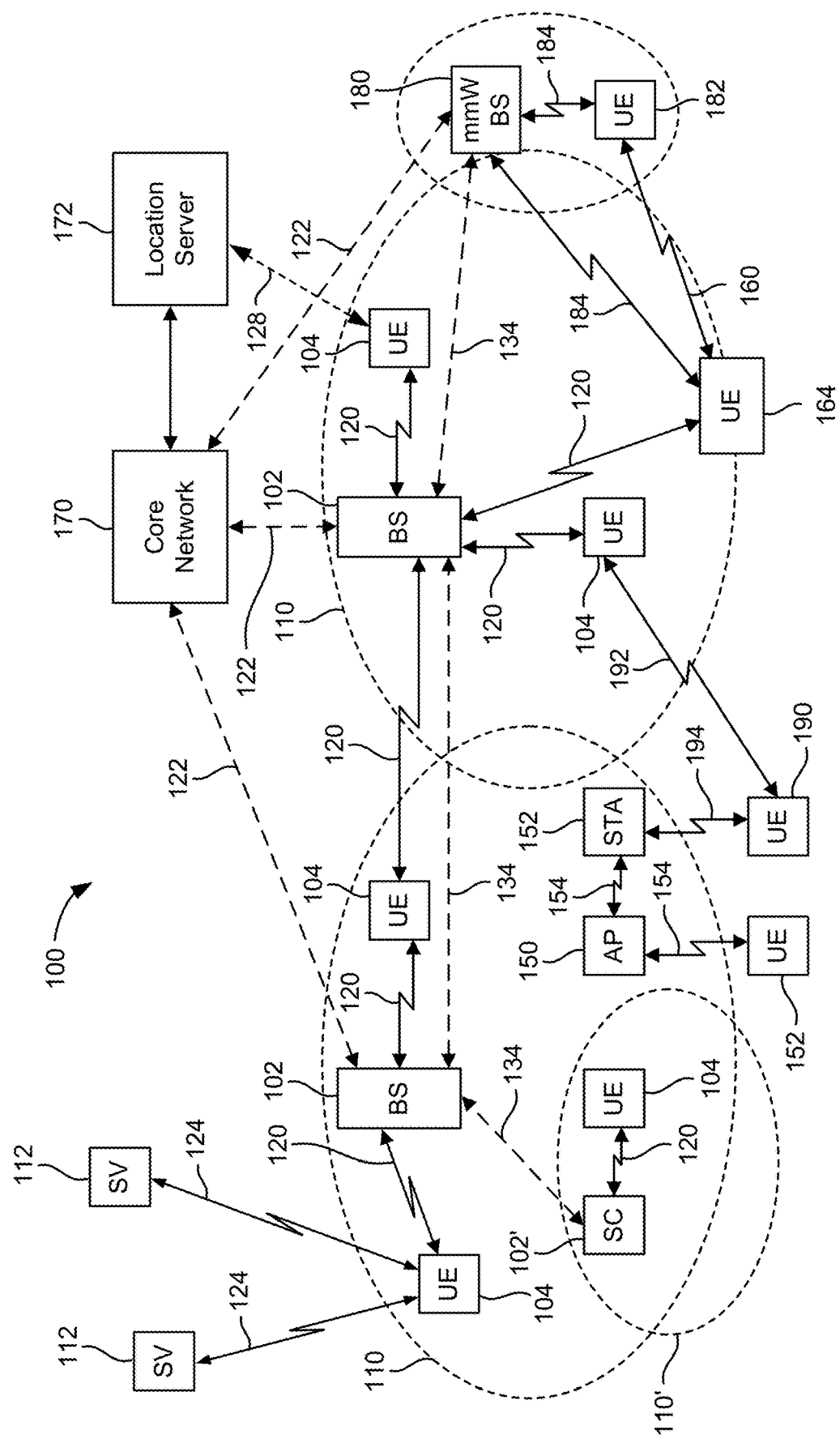
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

Various aspects relate generally to carrier phase measurement error information associated with position estimation of a user equipment.

Particular aspects of the subject matter described in this disclosure can be implemented to realize one or more of the following potential advantages. Aspects of the disclosure are directed communicating a carrier phase measurement in conjunction with an indication of error information associated with the carrier phase measurement. A position estimation entity may factor the carrier phase measurement into position estimation of a user equipment (UE). Such aspects may provide various technical advantages, such as improved position estimation accuracy, reduced position estimation latency, and so on.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHZ). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MULTEFIRE®.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHZ with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHZ-7.125 GHZ) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the INTERNATIONAL TELECOMMUNICATION UNION® as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1. UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WI-FI DIRECT®, BLUETOOTH®, and so on.

Figure 2A:
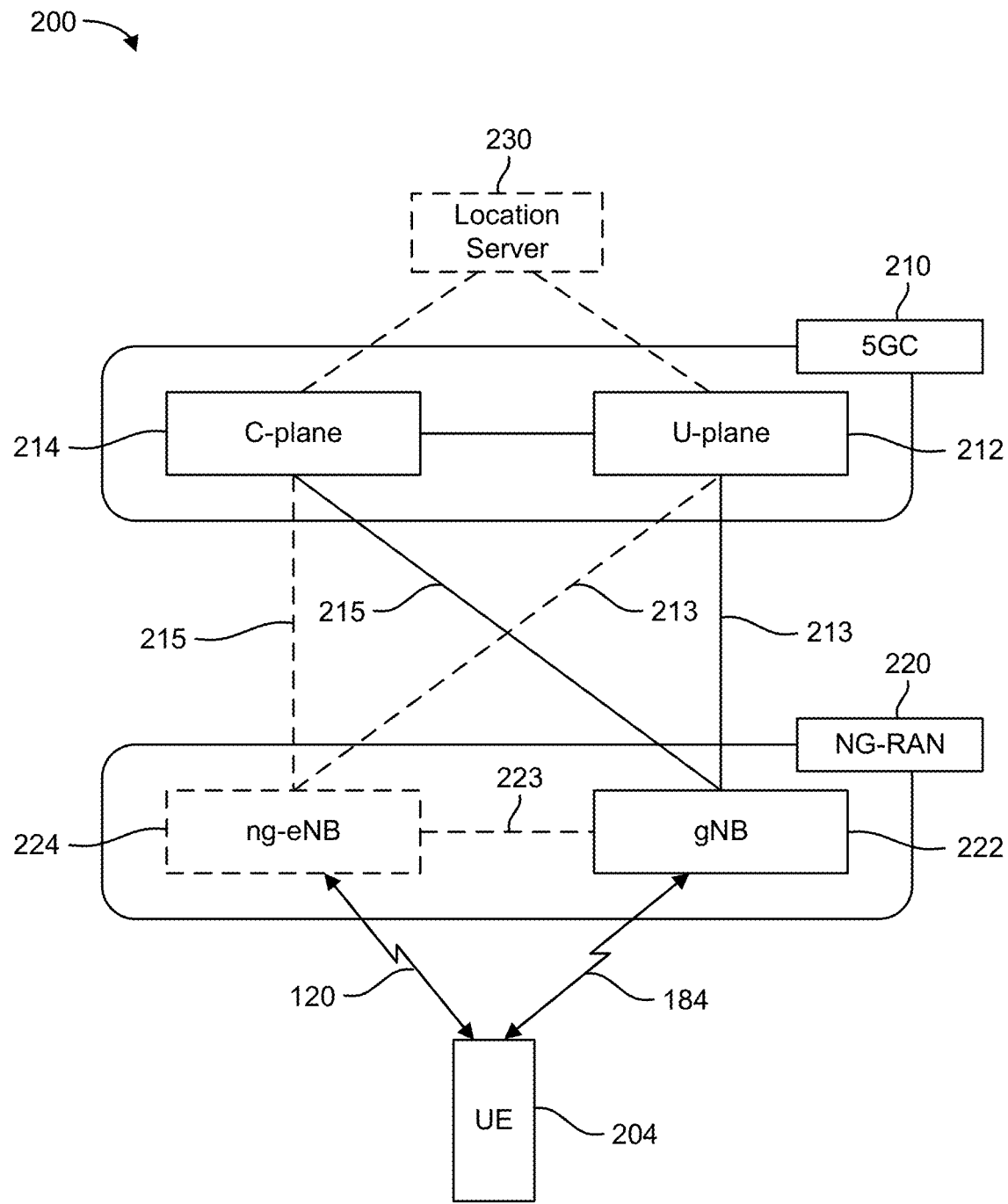
FIGS. 2A, 2B, and 2C illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-NB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
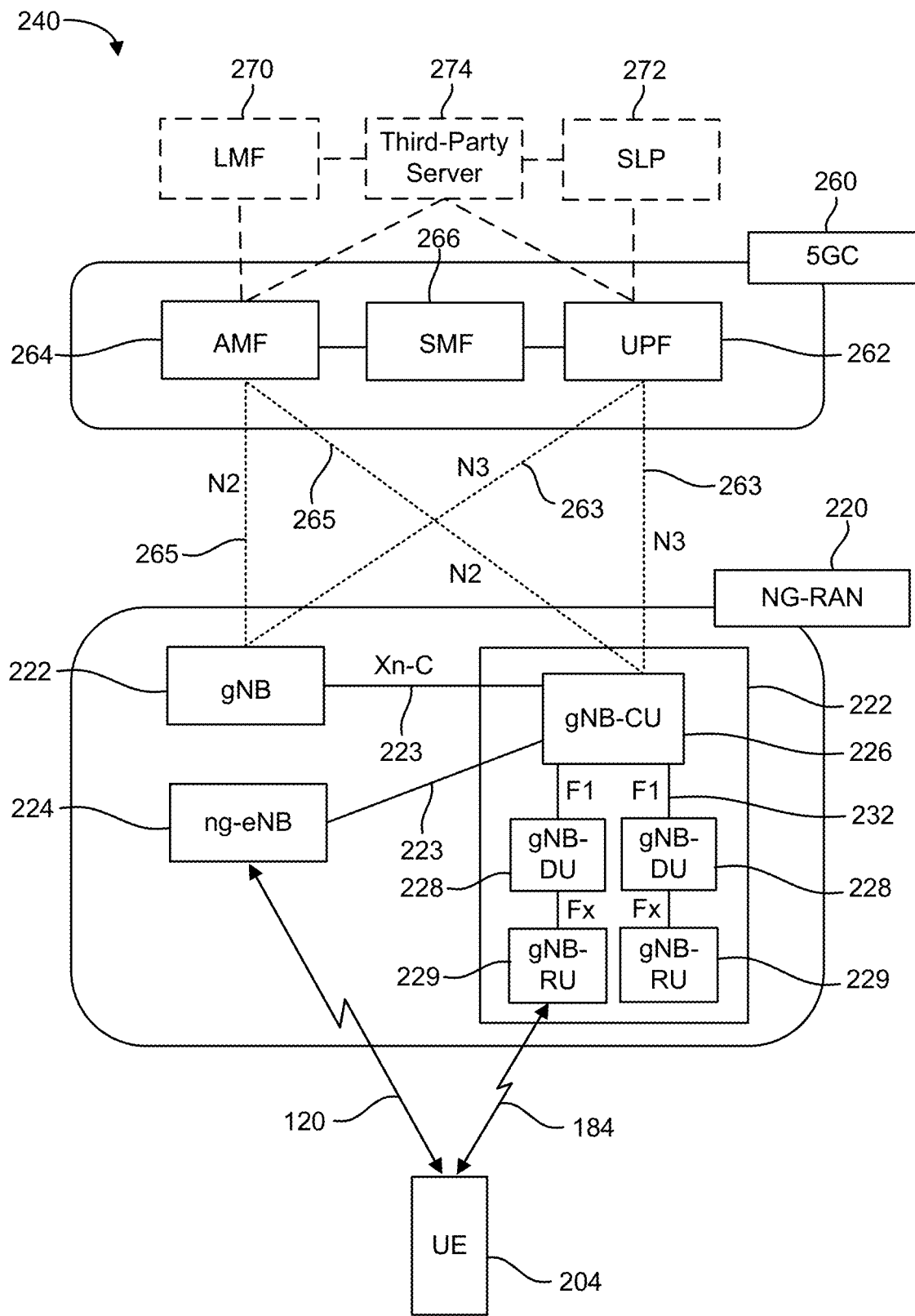

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP® (Third Generation Partnership Project) access networks.

Functions of the UPF 262 include acting as an anchor point for intra/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station, or one or more units (or one or more components) performing base station functionality, may be implemented in an aggregated or disaggregated architecture. For example, a base station (such as a Node B (NB), evolved NB (CNB), NR base station, 5G NB, access point (AP), a transmit receive point (TRP), or a cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN ALLIANCE®)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2C:
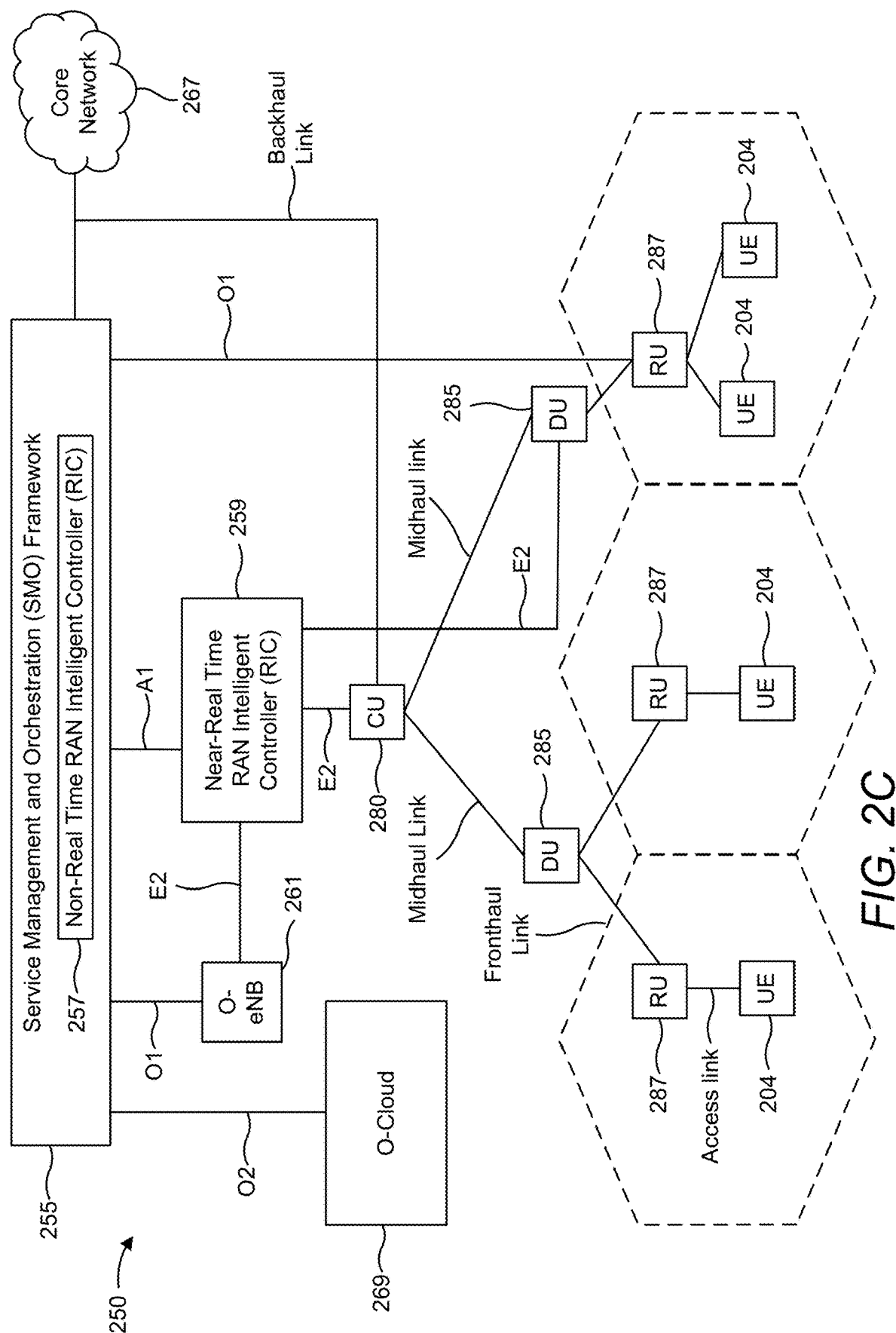

FIG. 2C illustrates an example disaggregated base station architecture 250, according to aspects of the disclosure. The disaggregated base station architecture 250 may include one or more central units (CUs) 280 (e.g., gNB-CU 226) that can communicate directly with a core network 267 (e.g., 5GC 210, 5GC 260) via a backhaul link, or indirectly with the core network 267 through one or more disaggregated base station units (such as a Near-Real Time (Near-RT) RAN Intelligent Controller (RIC) 259 via an E2 link, or a Non-Real Time (Non-RT) RIC 257 associated with a Service Management and Orchestration (SMO) Framework 255, or both). A CU 280 may communicate with one or more DUs 285 (e.g., gNB-DUs 228) via respective midhaul links, such as an F1 interface. The DUs 285 may communicate with one or more radio units (RUS) 287 (e.g., gNB-RUs 229) via respective fronthaul links. The RUs 287 may communicate with respective UEs 204 via one or more radio frequency (RF) access links. In some implementations, the UE 204 may be simultaneously served by multiple RUs 287.

Each of the units, i.e., the CUS 280, the DUs 285, the RUs 287, as well as the Near-RT RICs 259, the Non-RT RICs 257 and the SMO Framework 255, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a RF transceiver), configured to receive or transmit signals, or both, over a wireless transmission medium to one or more of the other units.

In some aspects, the CU 280 may host one or more higher layer control functions. Such control functions can include RRC, PDCP, service data adaptation protocol (SDAP), or the like. Each control function can be implemented with an interface configured to communicate signals with other control functions hosted by the CU 280. The CU 280 may be configured to handle user plane functionality (i.e., Central Unit-User Plane (CU-UP)), control plane functionality (i.e., Central Unit-Control Plane (CU-CP)), or a combination thereof. In some implementations, the CU 280 can be logically split into one or more CU-UP units and one or more CU-CP units. The CU-UP unit can communicate bidirectionally with the CU-CP unit via an interface, such as the E1 interface when implemented in an O-RAN configuration. The CU 280 can be implemented to communicate with the DU 285, as necessary, for network control and signaling.

The DU 285 may correspond to a logical unit that includes one or more base station functions to control the operation of one or more RUs 287. In some aspects, the DU 285 may host one or more of a RLC layer, a MAC layer, and one or more high PHY layers (such as modules for forward error correction (FEC) encoding and decoding, scrambling, modulation and demodulation, or the like) depending, at least in part, on a functional split, such as those defined by the 3rd Generation Partnership Project (3GPP®). In some aspects, the DU 285 may further host one or more low PHY layers. Each layer (or module) can be implemented with an interface configured to communicate signals with other layers (and modules) hosted by the DU 285, or with the control functions hosted by the CU 280.

Lower-layer functionality can be implemented by one or more RUs 287. In some deployments, an RU 287, controlled by a DU 285, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 287 can be implemented to handle over the air (OTA) communication with one or more UEs 204. In some implementations, real-time and non-real-time aspects of control and user plane communication with the RU(s) 287 can be controlled by the corresponding DU 285. In some scenarios, this configuration can enable the DU(s) 285 and the CU 280 to be implemented in a cloud-based RAN architecture, such as a vRAN architecture.

The SMO Framework 255 may be configured to support RAN deployment and provisioning of non-virtualized and virtualized network elements. For non-virtualized network elements, the SMO Framework 255 may be configured to support the deployment of dedicated physical resources for RAN coverage requirements which may be managed via an operations and maintenance interface (such as an O1 interface). For virtualized network elements, the SMO Framework 255 may be configured to interact with a cloud computing platform (such as an open cloud (O-Cloud) 269) to perform network element life cycle management (such as to instantiate virtualized network elements) via a cloud computing platform interface (such as an O2 interface). Such virtualized network elements can include, but are not limited to, CUs 280, DUs 285, RUS 287 and Near-RT RICs 259. In some implementations, the SMO Framework 255 can communicate with a hardware aspect of a 4G RAN, such as an open eNB (O-eNB) 261, via an O1 interface. Additionally, in some implementations, the SMO Framework 255 can communicate directly with one or more RUs 287 via an O1 interface. The SMO Framework 255 also may include a Non-RT RIC 257 configured to support functionality of the SMO Framework 255.

The Non-RT RIC 257 may be configured to include a logical function that enables non-real-time control and optimization of RAN elements and resources, artificial intelligence/machine learning (AI/ML) workflows including model training and updates, or policy-based guidance of applications/features in the Near-RT RIC 259. The Non-RT RIC 257 may be coupled to or communicate with (such as via an A1 interface) the Near-RT RIC 259. The Near-RT RIC 259 may be configured to include a logical function that enables near-real-time control and optimization of RAN elements and resources via data collection and actions over an interface (such as via an E2 interface) connecting one or more CUs 280, one or more DUs 285, or both, as well as an O-eNB, with the Near-RT RIC 259.

In some implementations, to generate AI/ML models to be deployed in the Near-RT RIC 259, the Non-RT RIC 257 may receive parameters or external enrichment information from external servers. Such information may be utilized by the Near-RT RIC 259 and may be received at the SMO Framework 255 or the Non-RT RIC 257 from non-network data sources or from network functions. In some examples, the Non-RT RIC 257 or the Near-RT RIC 259 may be configured to tune RAN behavior or performance. For example, the Non-RT RIC 257 may monitor long-term trends and patterns for performance and employ AI/ML models to perform corrective actions through the SMO Framework 255 (such as reconfiguration via O1) or via creation of RAN management policies (such as A1 policies).

Figure 3A:
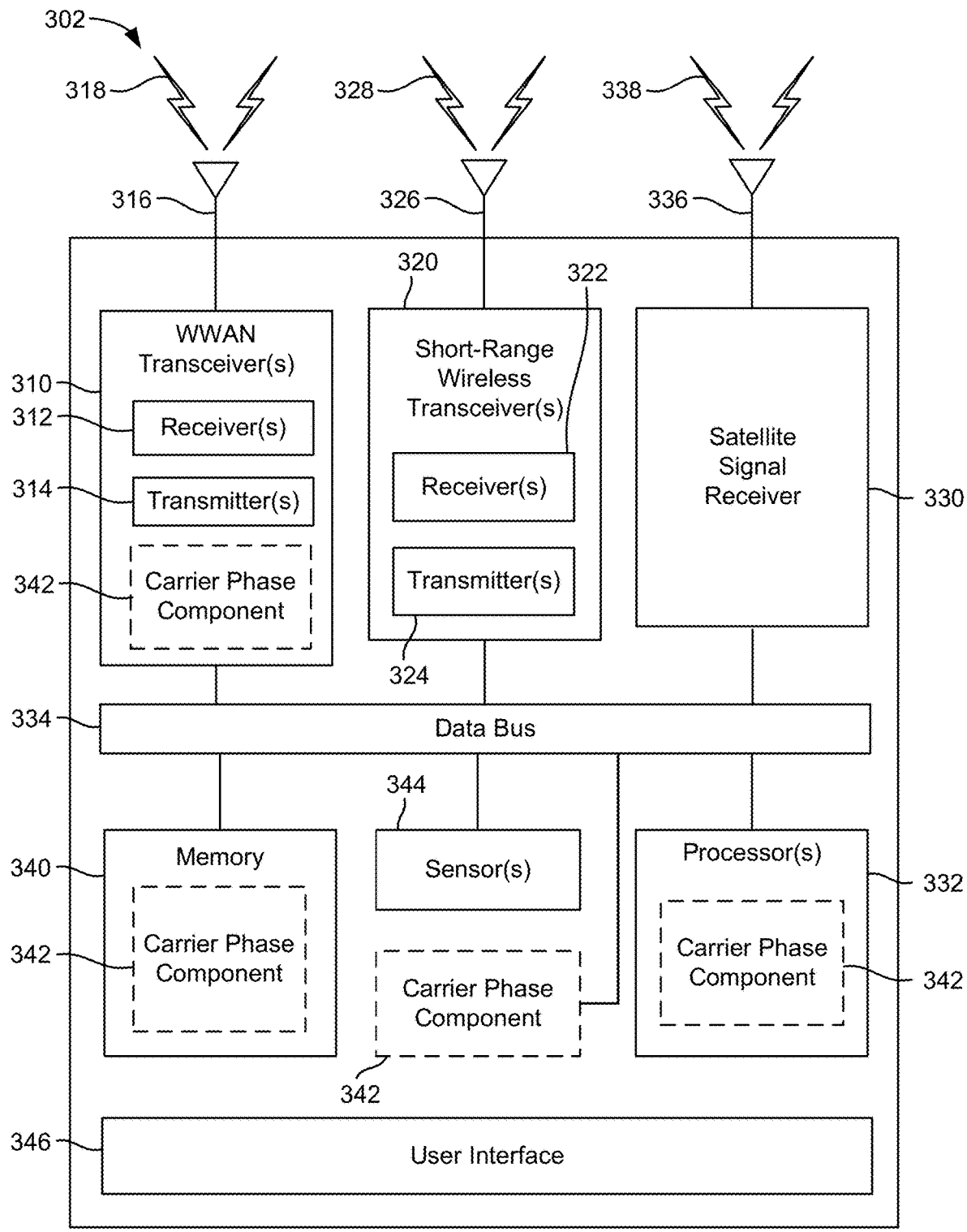
FIGS. 3A, 3B, and 3C are simplified block diagrams of several sample aspects of components that may be employed in a user equipment (UE), a base station, and a network entity, respectively, and configured to support communications as taught herein.
Figure 3B:
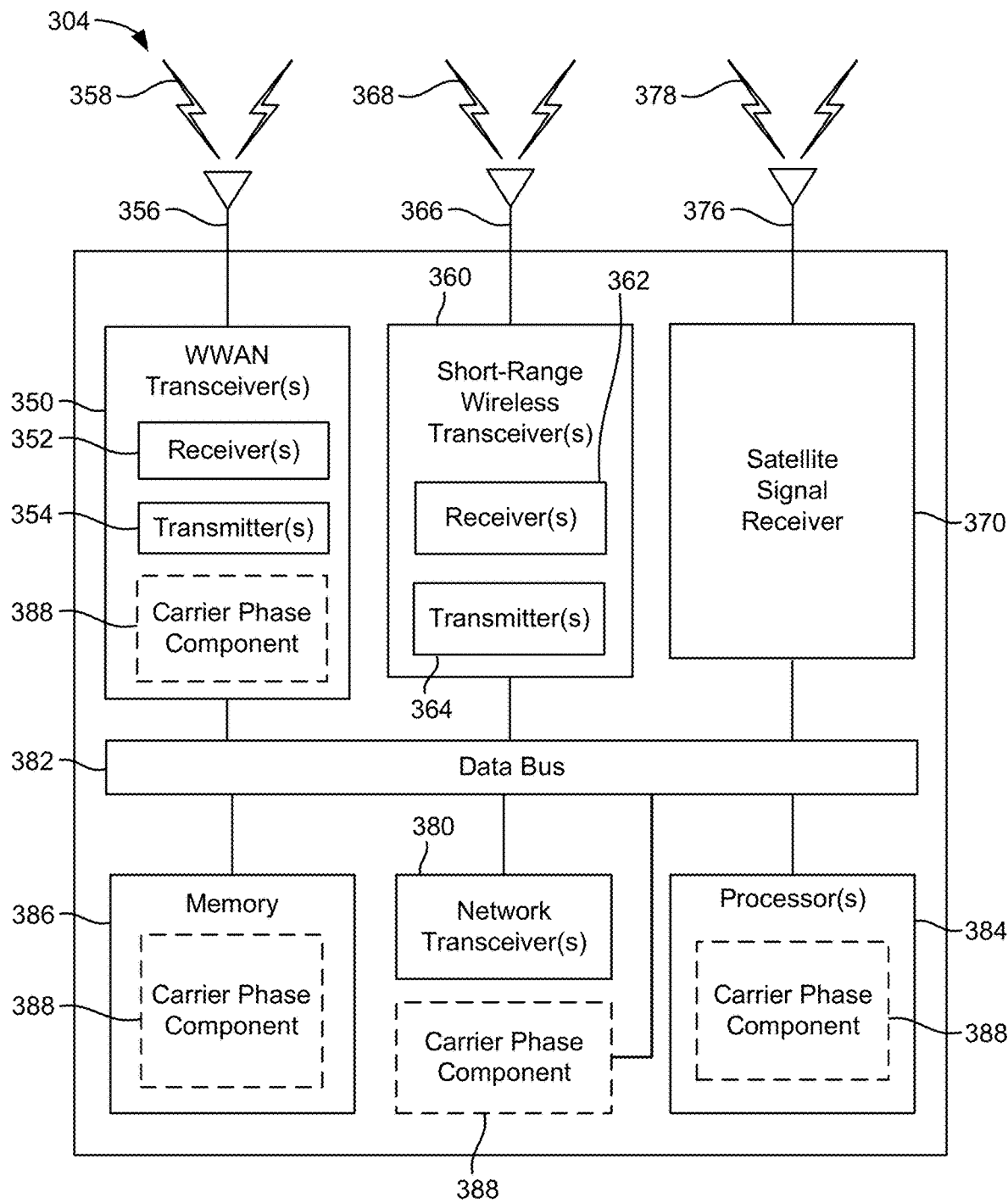
Figure 3C:
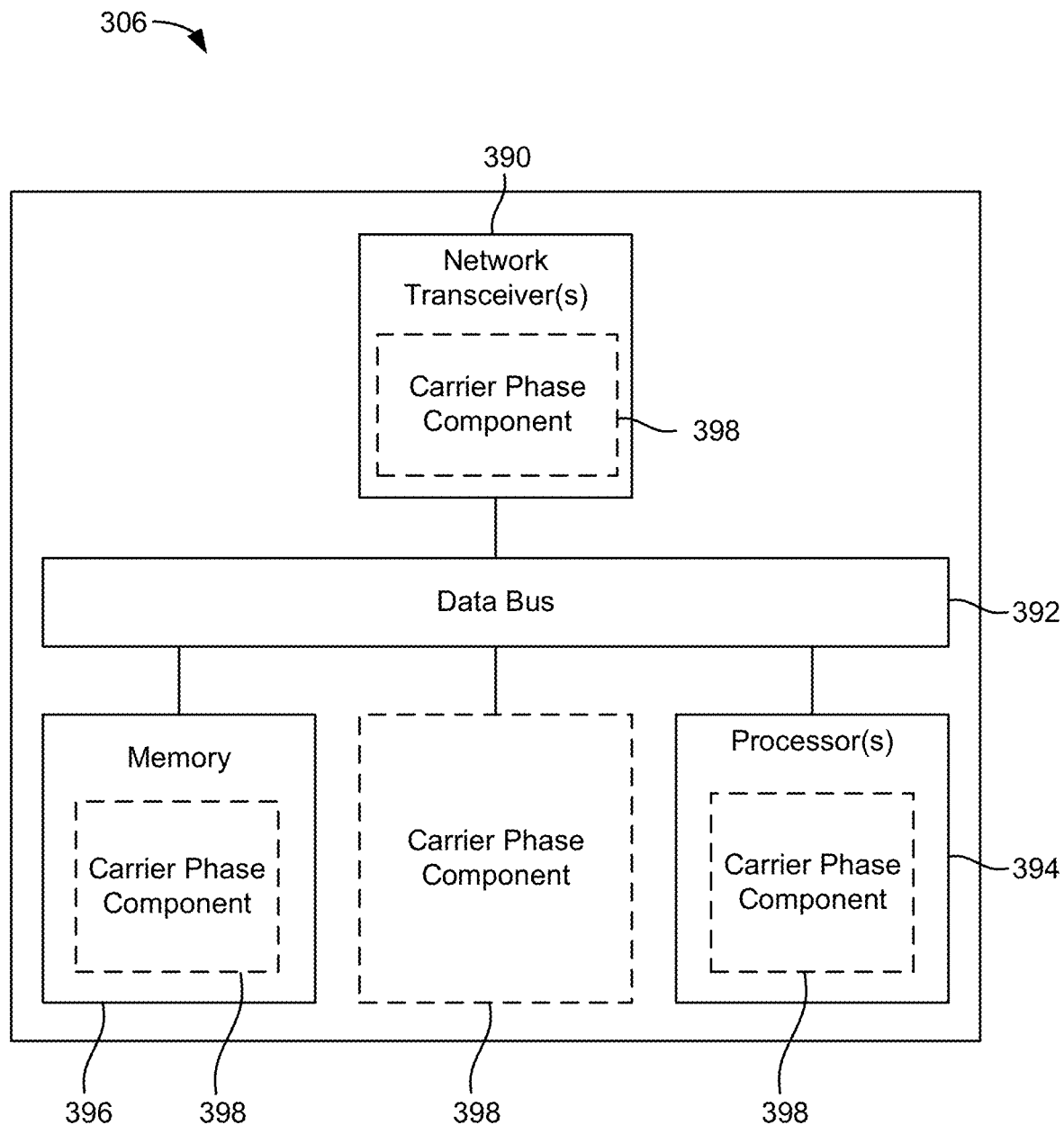

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/ frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., Wi-Fi, LTE Direct, BLUETOOTH®, ZIGBEE®, Z-WAVE®, PC5, dedicated short-range communications (DSRC), wireless access for vehicular environments (WAVE), near-field communication (NFC), ultra-wideband (UWB), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be Wi-Fi transceivers, BLUETOOTH® transceivers, ZIGBEE® and/or Z-WAVE® transceivers, NFC transceivers, UWB transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS®) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include carrier phase component 342, 388, and 398, respectively. The carrier phase component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the carrier phase component 342, 388, and 398 may be external to the processors 332, 384, and 394 (e.g., part of a modem processing system, integrated with another processing system, etc.). Alternatively, the carrier phase component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the carrier phase component 342, which may be, for example, part of the one or more WWAN transceivers 310, the memory 340, the one or more processors 332, or any combination thereof, or may be a standalone component. FIG. 3B illustrates possible locations of the carrier phase component 388, which may be, for example, part of the one or more WWAN transceivers 350, the memory 386, the one or more processors 384, or any combination thereof, or may be a standalone component. FIG. 3C illustrates possible locations of the carrier phase component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a microelectrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the downlink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or personal computer (PC) or laptop may have Wi-Fi and/or BLUETOOTH® capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite signal receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the carrier phase component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as Wi-Fi).

Note that the UE 302 illustrated in FIG. 3A may represent a "reduced capability" ("RedCap") UE or a "premium" UE. As described further below, while RedCap and premium UEs may have the same types of components (e.g., both may have one or more WWAN transceivers 310, one or more processors 332, memory 340, etc.), the components may have different degrees of functionality (e.g., increased or decreased performance, more or fewer capabilities, etc.) depending on whether the UE 302 corresponds to a RedCap UE or a premium UE.

Figure 4:
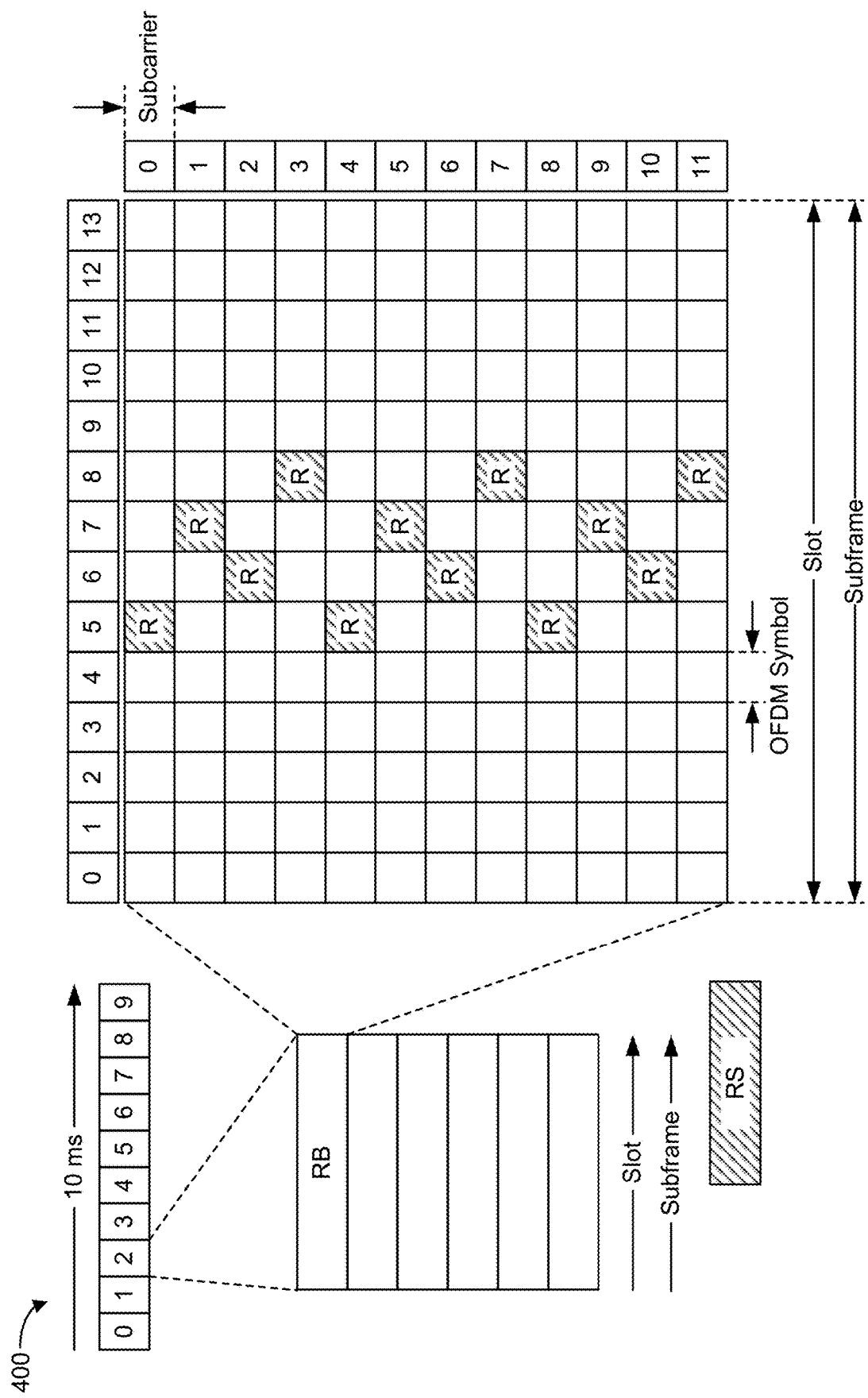
FIG. 4 is a diagram illustrating an example frame structure, according to aspects of the disclosure.

Various frame structures may be used to support downlink and uplink transmissions between network nodes (e.g., base stations and UEs). FIG. 4 is a diagram 400 illustrating an example frame structure, according to aspects of the disclosure. The frame structure may be a downlink or uplink frame structure. Other wireless communications technologies may have different frame structures and/or different channels. LTE, and in some cases NR, utilizes orthogonal frequency-division multiplexing (OFDM) on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal fast Fourier transform (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHZ (i.e., 6 resource blocks), and there may be 1, 2, 4, 8, or 16 subbands for system bandwidth of 1.25, 2.5, 5, 10, or 20 MHZ, respectively.

LTE supports a single numerology (subcarrier spacing (SCS), symbol length, etc.). In contrast, NR may support multiple numerologies ($\mu$), for example, subcarrier spacings of 15 kHz ($\mu=0$), 30 kHz ($\mu=1$), 60 kHz ($\mu=2$), 120 kHz ($\mu=3$), and 240 kHz ($\mu=4$) or greater may be available. In each subcarrier spacing, there are 14 symbols per slot. For 15 kHz SCS ($\mu=0$), there is one slot per subframe, 10 slots per frame, the slot duration is 1 millisecond (ms), the symbol duration is 66.7 microseconds ($\mu$s), and the maximum nominal system bandwidth (in MHZ) with a 4K FFT size is 50. For 30 kHz SCS ($\mu=1$), there are two slots per subframe, 20 slots per frame, the slot duration is 0.5 ms, the symbol duration is 33.3 $\mu$s, and the maximum nominal system bandwidth (in MHZ) with a 4K FFT size is 100. For 60 KHz SCS ($\mu=2$), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu=3$), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu=4$), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIG. 4, a numerology of 15 kHz is used. Thus, in the time domain, a 10 ms frame is divided into 10 equally sized subframes of 1 ms each, and each subframe includes one time slot. In FIG. 4, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 4 illustrates example locations of REs carrying a reference signal (labeled "R").

Figure 5:
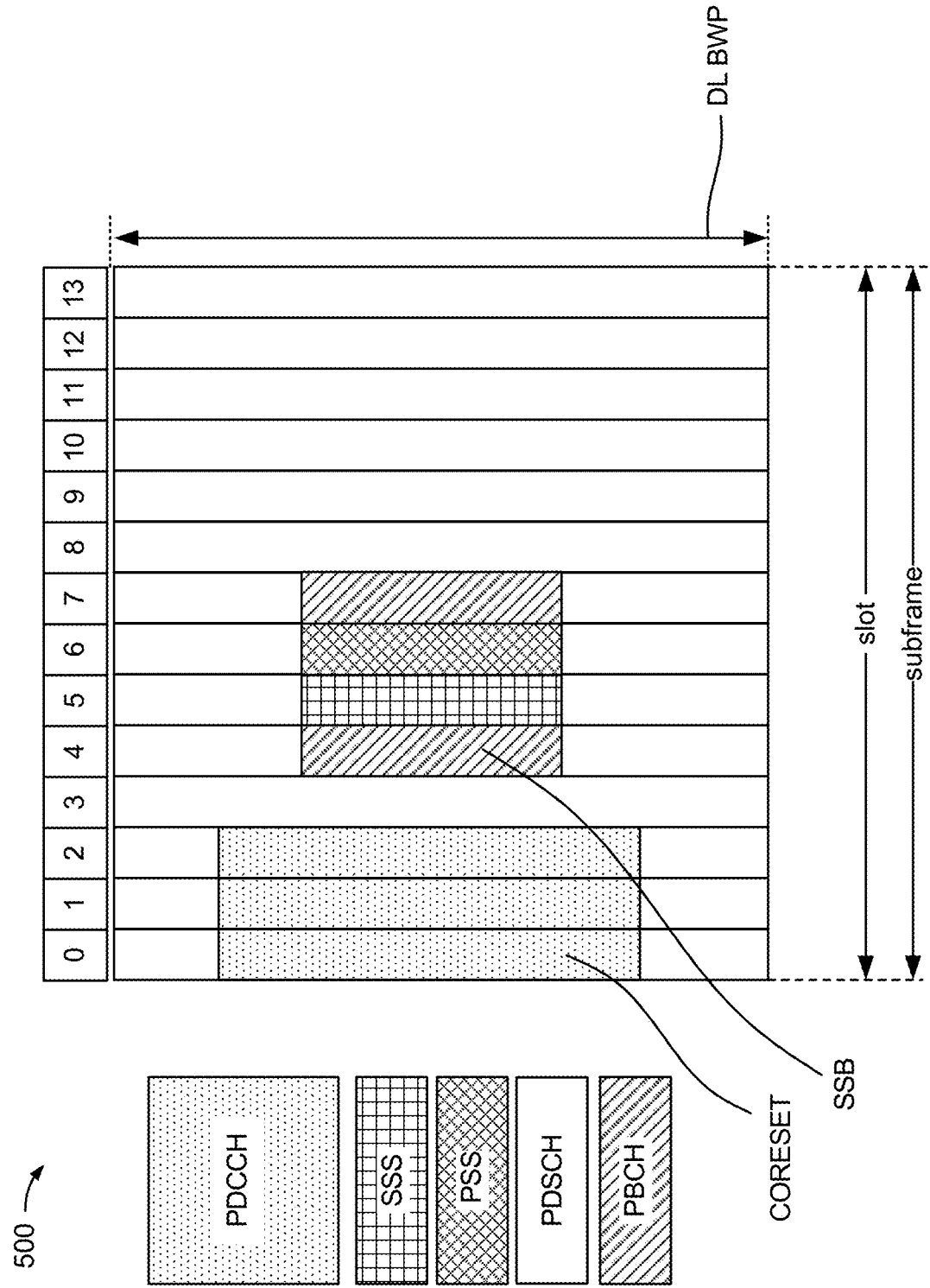
FIG. 5 is a diagram illustrating various downlink channels within an example downlink slot, according to aspects of the disclosure.

FIG. 5 is a diagram 500 illustrating various downlink channels within an example downlink slot. In FIG. 5, time is represented horizontally (on the X axis) with time increasing from left to right, while frequency is represented vertically (on the Y axis) with frequency increasing (or decreasing) from bottom to top. In the example of FIG. 5, a numerology of 15 kHz is used. Thus, in the time domain, the illustrated slot is one millisecond (ms) in length, divided into 14 symbols.

In NR, the channel bandwidth, or system bandwidth, is divided into multiple bandwidth parts (BWPs). A BWP is a contiguous set of RBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 5, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries a master information block (MIB), may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 5, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 5 is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., physical uplink shared channel (PUSCH)). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration.

Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4 illustrates an example PRS resource configuration for comb-4 (which spans four symbols). That is, the locations of the shaded REs (labeled "R") indicate a comb-4 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3} (as in the example of FIG. 4); 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu$*{4, 5, 8, 10, 16, 20, 32, 40, 64, 80, 160, 320, 640, 1280, 2560, 5120, 10240} slots, with $\mu$=0, 1, 2, 3. The repetition factor may have a length selected from {1, 2, 4, 6, 8, 16, 32} slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR. TRS, PTRS, CRS, CSI-RS, DMRS, PSS, SSS, SSB, SRS, UL-PRS, etc. In addition, the terms "positioning reference signal" and "PRS" may refer to downlink, uplink, or sidelink positioning reference signals, unless otherwise indicated by the context. If needed to further distinguish the type of PRS, a downlink positioning reference signal may be referred to as a "DL-PRS," an uplink positioning reference signal (e.g., an SRS-for-positioning, PTRS) may be referred to as an "UL-PRS," and a sidelink positioning reference signal may be referred to as an "SL-PRS." In addition, for signals that may be transmitted in the downlink, uplink, and/or sidelink (e.g., DMRS), the signals may be prepended with "DL," "UL," or "SL" to distinguish the direction. For example, "UL-DMRS" is different from "DL-DMRS."

Figure 6:
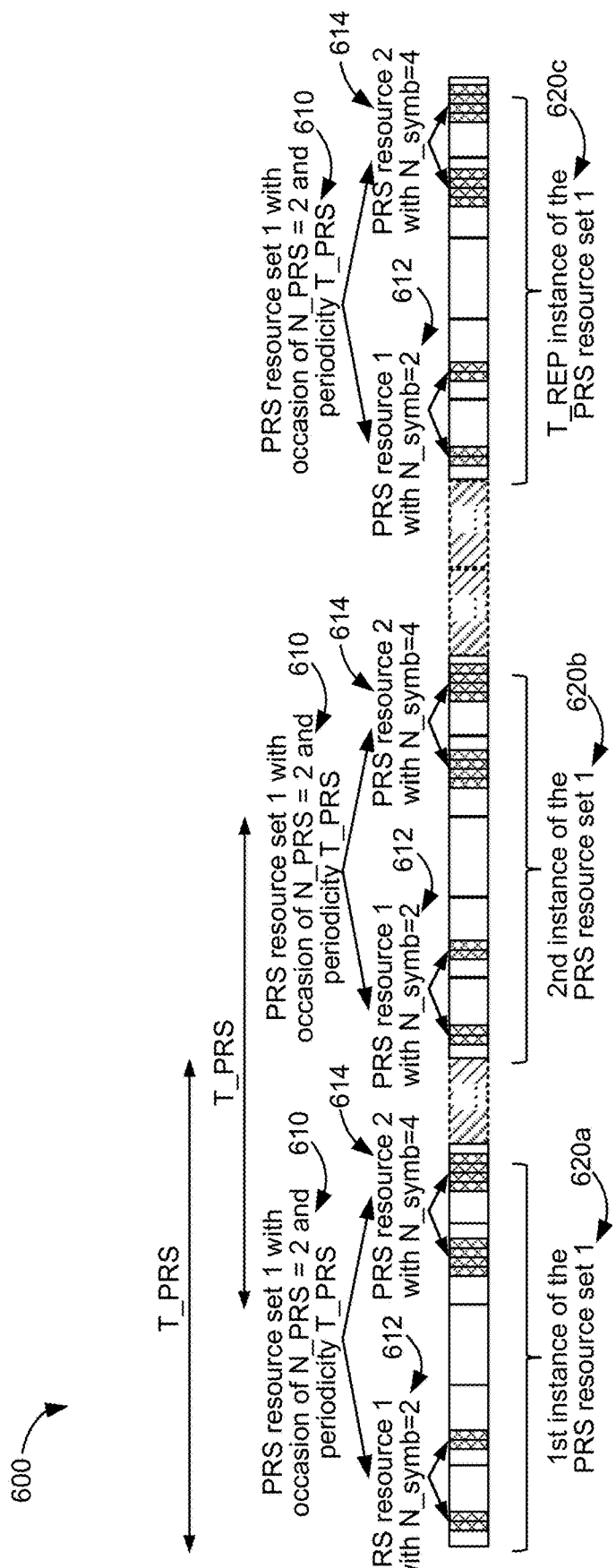
FIG. 6 is a diagram of an example positioning reference signal (PRS) configuration for the PRS transmissions of a given base station, according to aspects of the disclosure.

FIG. 6 is a diagram of an example PRS configuration 600 for the PRS transmissions of a given base station, according to aspects of the disclosure. In FIG. 6, time is represented horizontally, increasing from left to right. Each long rectangle represents a slot and each short (shaded) rectangle represents an OFDM symbol. In the example of FIG. 6, a PRS resource set 610 (labeled "PRS resource set 1") includes two PRS resources, a first PRS resource 612 (labeled "PRS resource 1") and a second PRS resource 614 (labeled "PRS resource 2"). The base station transmits PRS on the PRS resources 612 and 614 of the PRS resource set 610.

The PRS resource set 610 has an occasion length (N_PRS) of two slots and a periodicity (T_PRS) of, for example, 160 slots or 160 milliseconds (ms) (for 15 kHz subcarrier spacing). As such, both the PRS resources 612 and 614 are two consecutive slots in length and repeat every T_PRS slots, starting from the slot in which the first symbol of the respective PRS resource occurs. In the example of FIG. 6, the PRS resource 612 has a symbol length (N_symb) of two symbols, and the PRS resource 614 has a symbol length (N_symb) of four symbols. The PRS resource 612 and the PRS resource 614 may be transmitted on separate beams of the same base station.

Each instance of the PRS resource set 610, illustrated as instances 620a, 620b, and 620c, includes an occasion of length '2' (i.e., N_PRS=2) for each PRS resource 612, 614 of the PRS resource set. The PRS resources 612 and 614 are repeated every T_PRS slots up to the muting sequence periodicity T_REP. As such, a bitmap of length T_REP would be needed to indicate which occasions of instances 620a, 620b, and 620c of PRS resource set 610 are muted (i.e., not transmitted).

In an aspect, there may be additional constraints on the PRS configuration 600. For example, for all PRS resources (e.g., PRS resources 612, 614) of a PRS resource set (e.g., PRS resource set 610), the base station can configure the following parameters to be the same: (a) the occasion length (N_PRS), (b) the number of symbols (N_symb), (c) the comb type, and/or (d) the bandwidth. In addition, for all PRS resources of all PRS resource sets, the subcarrier spacing and the cyclic prefix can be configured to be the same for one base station or for all base stations. Whether it is for one base station or all base stations may depend on the UE's capability to support the first and/or second option.

Figure 7:
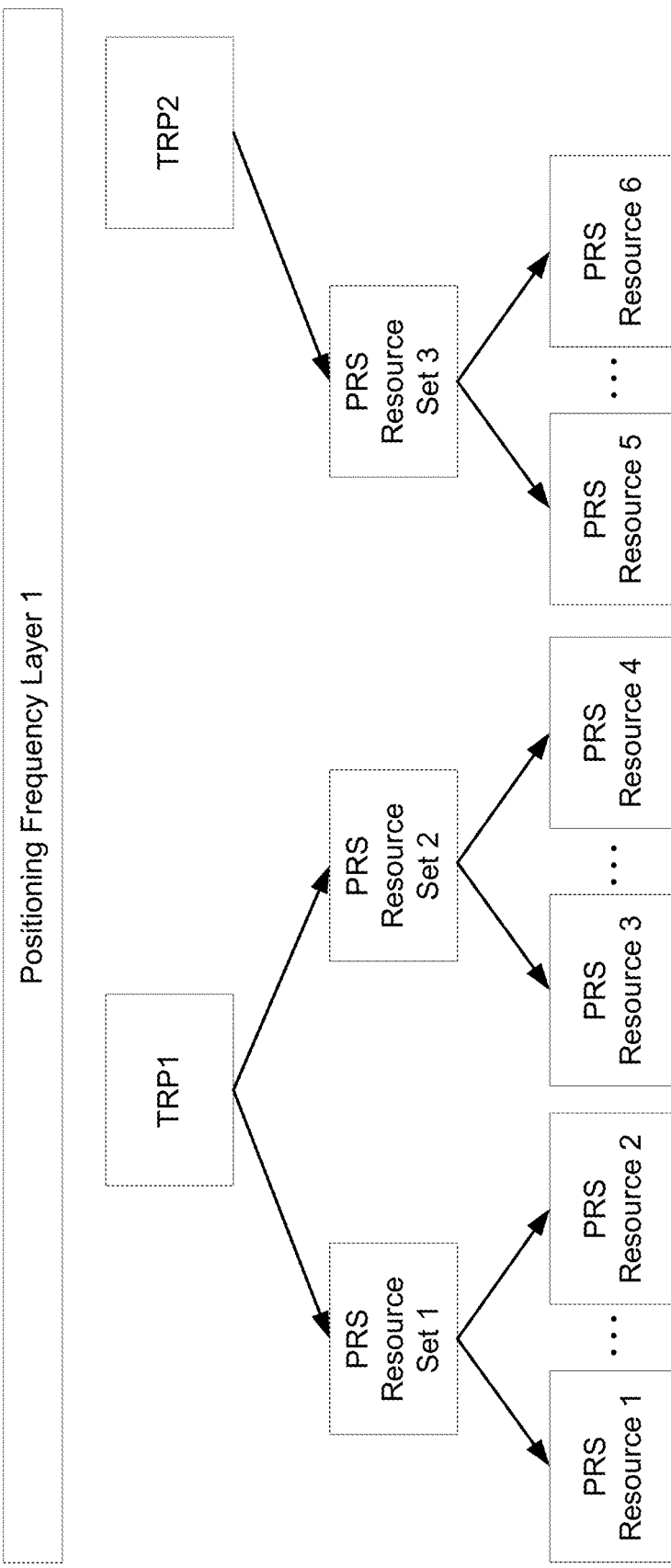
FIG. 7 is a diagram illustrating an example downlink positioning reference signal (DL-PRS) configuration for two transmission-reception points (TRPs) operating in the same positioning frequency layer, according to aspects of the disclosure.

FIG. 7 is a diagram 700 illustrating an example PRS configuration for two TRPs (labeled "TRP1" and "TRP2") operating in the same positioning frequency layer (labeled "Positioning Frequency Layer 1"), according to aspects of the disclosure. For a positioning session, a UE may be provided with assistance data indicating the illustrated PRS configuration. In the example of FIG. 7, the first TRP ("TRP1") is associated with (e.g., transmits) two PRS resource sets, labeled "PRS Resource Set 1" and "PRS Resource Set 2," and the second TRP ("TRP2") is associated with one PRS resource set, labeled "PRS Resource Set 3." Each PRS resource set comprises at least two PRS resources. Specifically, the first PRS resource set ("PRS Resource Set 1") includes PRS resources labeled "PRS Resource 1" and "PRS Resource 2," the second PRS resource set ("PRS Resource Set 2") includes PRS resources labeled "PRS Resource 3" and "PRS Resource 4," and the third PRS resource set ("PRS Resource Set 3") includes PRS resources labeled "PRS Resource 5" and "PRS Resource 6."

When a UE is configured in the assistance data of a positioning method with a number of PRS resources beyond its capability, the UE assumes the PRS resources in the assistance data are sorted in a decreasing order of measurement priority. Currently, the 64 TRPs per frequency layer are sorted according to priority and the two PRS resource sets per TRP of the frequency layer are sorted according to priority. However, the four frequency layers may or may not be sorted according to priority, and the 64 PRS resources of the PRS resource set per TRP per frequency layer may or may not be sorted according to priority. The reference indicated by the assistance data parameter "nr-DL-PRS-ReferenceInfo" for each frequency layer has the highest priority, at least for DL-TDOA positioning procedures.

Figure 8:
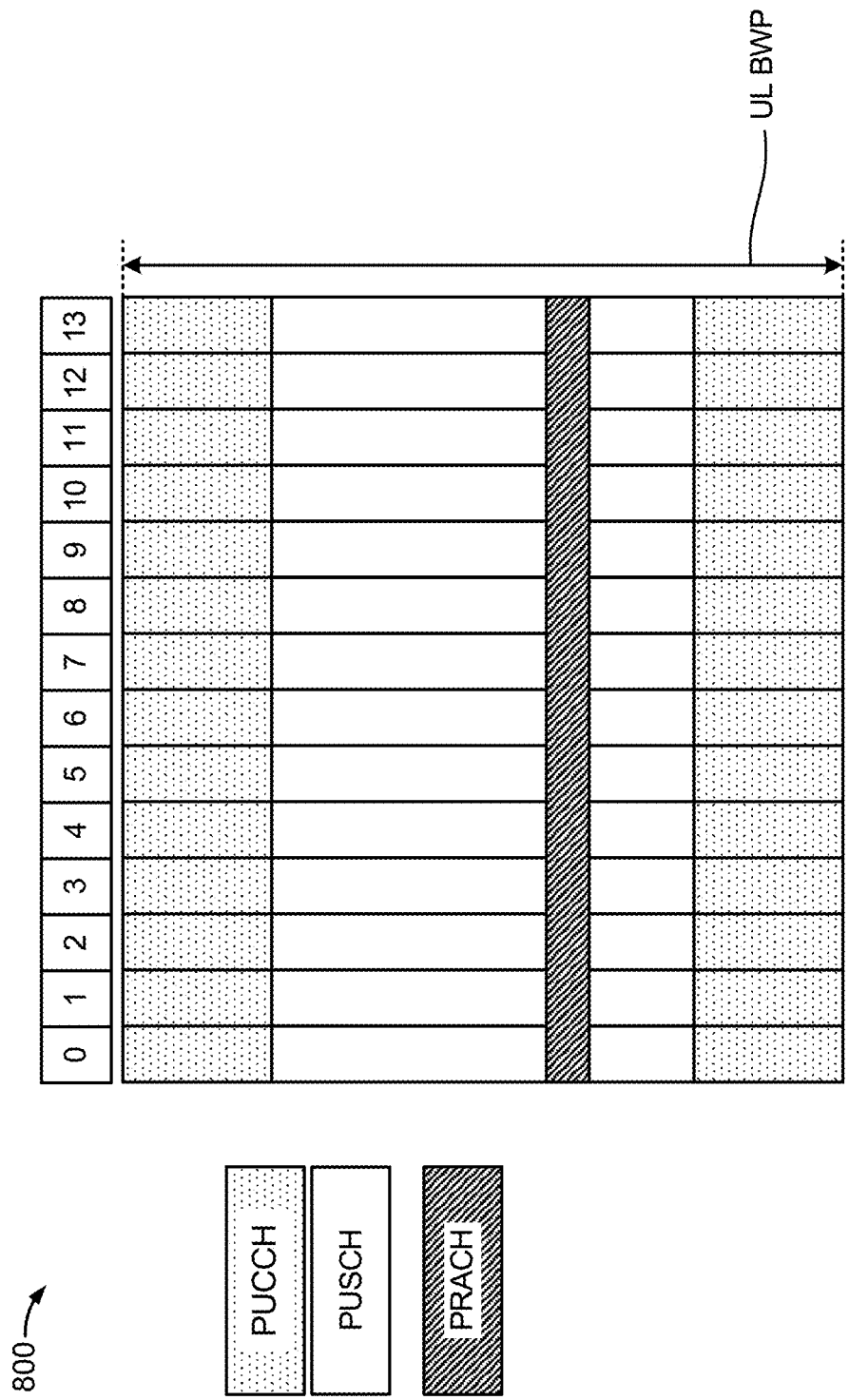
FIG. 8 is a diagram illustrating various uplink channels within an example uplink slot, according to aspects of the disclosure.

FIG. 8 is a diagram 800 illustrating various uplink channels within an example uplink slot. In FIG. 8, time is represented horizontally (on the X axis) with time increasing from left to right, while frequency is represented vertically (on the Y axis) with frequency increasing (or decreasing) from bottom to top. In the example of FIG. 8, a numerology of 15 kHz is used. Thus, in the time domain, the illustrated slot is one millisecond (ms) in length, divided into 14 symbols.

A random-access channel (RACH), also referred to as a physical random-access channel (PRACH), may be within one or more slots within a frame based on the PRACH configuration. The PRACH may include six consecutive RB pairs within a slot. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

In an aspect, the reference signal carried on the REs labeled "R" in FIG. 4 may be SRS. SRS transmitted by a UE may be used by a base station to obtain the channel state information (CSI) for the transmitting UE. CSI describes how an RF signal propagates from the UE to the base station and represents the combined effect of scattering, fading, and power decay with distance. The system uses the SRS for resource scheduling, link adaptation, massive MIMO, beam management, etc.

A collection of REs that are used for transmission of SRS is referred to as an "SRS resource," and may be identified by the parameter "SRS-ResourceId." The collection of resource elements can span multiple PRBs in the frequency domain and 'N' (e.g., one or more) consecutive symbol(s) within a slot in the time domain. In a given OFDM symbol, an SRS resource occupies one or more consecutive PRBs. An "SRS resource set" is a set of SRS resources used for the transmission of SRS signals, and is identified by an SRS resource set ID ("SRS-ResourceSetId").

The transmission of SRS resources within a given PRB has a particular comb size (also referred to as the "comb density"). A comb size 'N' represents the subcarrier spacing (or frequency/tone spacing) within each symbol of an SRS resource configuration. Specifically, for a comb size 'N,' SRS are transmitted in every Nth subcarrier of a symbol of a PRB. For example, for comb-4, for each symbol of the SRS resource configuration, REs corresponding to every fourth subcarrier (such as subcarriers 0, 4, 8) are used to transmit SRS of the SRS resource. In the example of FIG. 4, the illustrated SRS is comb-4 over four symbols. That is, the locations of the shaded SRS REs indicate a comb-4 SRS resource configuration.

Currently, an SRS resource may span 1, 2, 4, 8, or 12 consecutive symbols within a slot with a comb size of comb-2, comb-4, or comb-8. The following are the frequency offsets from symbol to symbol for the SRS comb patterns that are currently supported. 1-symbol comb-2: {0}; 2-symbol comb-2: {0, 1}; 2-symbol comb-4: {0, 2}; 4-symbol comb-2: {0, 1, 0, 1}; 4-symbol comb-4: {0, 2, 1, 3} (as in the example of FIG. 4); 8-symbol comb-4: {0, 2, 1, 3, 0, 2, 1, 3}; 12-symbol comb-4: {0, 2, 1, 3, 0, 2, 1, 3, 0, 2, 1, 3}; 4-symbol comb-8: {0, 4, 2, 6}; 8-symbol comb-8: {0, 4, 2, 6, 1, 5, 3, 7}; and 12-symbol comb-8: {0, 4, 2, 6, 1, 5, 3, 7, 0, 4, 2, 6}, Generally, as noted above, a UE transmits SRS to enable the receiving base station (either the serving base station or a neighboring base station) to measure the channel quality (i.e., CSI) between the UE and the base station. However, SRS can also be specifically configured as uplink positioning reference signals for uplink-based positioning procedures, such as uplink time difference of arrival (UL-TDOA), round-trip-time (RTT), uplink angle-of-arrival (UL-AoA), etc. As used herein, the term "SRS" may refer to SRS configured for channel quality measurements or SRS configured for positioning purposes. The former may be referred to herein as "SRS-for-communication" and/or the latter may be referred to as "SRS-for-positioning" or "positioning SRS" when needed to distinguish the two types of SRS.

Several enhancements over the previous definition of SRS have been proposed for SRS-for-positioning (also referred to as "UL-PRS"), such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters "SpatialRelationInfo" and "PathLossReference" are to be configured based on a downlink reference signal or SSB from a neighboring TRP. Further still, one SRS resource may be transmitted outside the active BWP, and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There also may be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. All of these are features that are additional to the current SRS framework, which is configured through RRC higher layer signaling (and potentially triggered or activated through a MAC control element (MAC-CE) or downlink control information (DCI)).

Sidelink communication takes place in transmission or reception resource pools. In the frequency domain, the minimum resource allocation unit is a sub-channel (e.g., a collection of consecutive PRBs in the frequency domain). In the time domain, resource allocation is in one slot intervals. However, some slots are not available for sidelink, and some slots contain feedback resources. In addition, sidelink resources can be (pre) configured to occupy fewer than the 14 symbols of a slot.

Sidelink resources are configured at the radio resource control (RRC) layer. The RRC configuration can be by pre-configuration (e.g., preloaded on the UE) or configuration (e.g., from a serving base station).

Figure 9A:
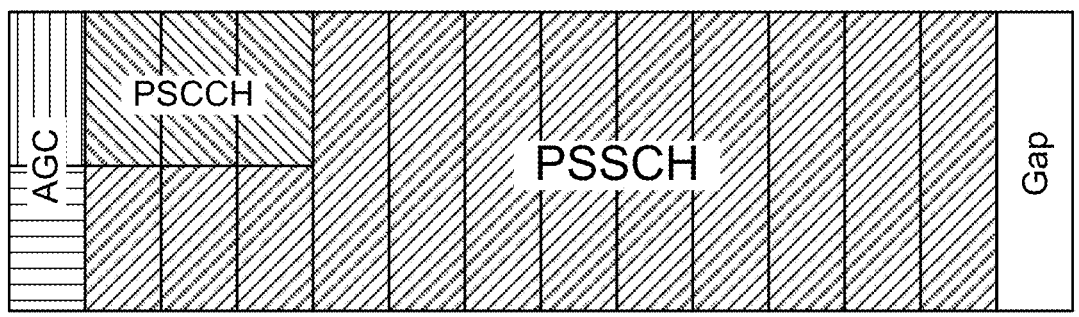
FIGS. 9A and 9B are diagrams of example sidelink slot structures with and without feedback resources, according to aspects of the disclosure.

NR sidelinks support hybrid automatic repeat request (HARQ) retransmission. FIG. 9A is a diagram 900 of an example slot structure without feedback resources, according to aspects of the disclosure. In the example of FIG. 9A, time is represented horizontally and frequency is represented vertically. In the time domain, the length of each block is one orthogonal frequency division multiplexing (OFDM) symbol, and the 14 symbols make up a slot. In the frequency domain, the height of each block is one sub-channel. Currently, the (pre) configured sub-channel size can be selected from the set of {10, 15, 20, 25, 50, 75, 100} physical resource blocks (PRBs).

For a sidelink slot, the first symbol is a repetition of the preceding symbol and is used for automatic gain control (AGC) setting. This is illustrated in FIG. 9A by the vertical and horizontal hashing. As shown in FIG. 9A, for sidelink, the physical sidelink control channel (PSCCH) and the physical sidelink shared channel (PSSCH) are transmitted in the same slot. Similar to the physical downlink control channel (PDCCH), the PSCCH carries control information about sidelink resource allocation and descriptions about sidelink data transmitted to the UE. Likewise, similar to the physical downlink shared channel (PDSCH), the PSSCH carries user data for the UE. In the example of FIG. 9A, the PSCCH occupies half the bandwidth of the sub-channel and only three symbols. Finally, a gap symbol is present after the PSSCH.

Figure 9B:
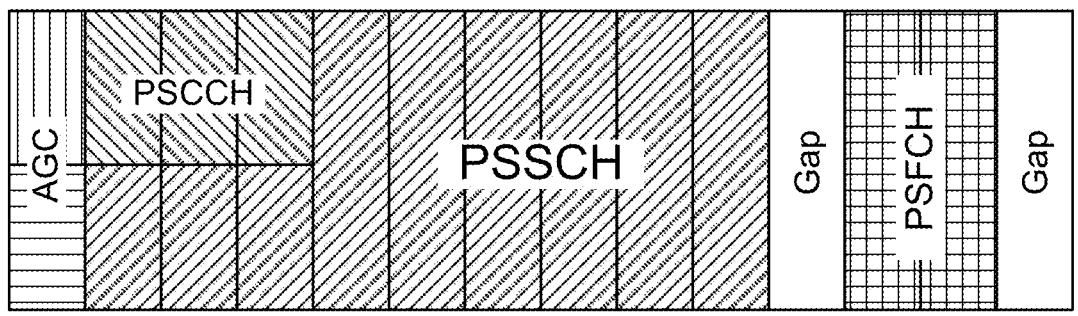

FIG. 9B is a diagram 950 of an example slot structure with feedback resources, according to aspects of the disclosure. In the example of FIG. 9B, time is represented horizontally and frequency is represented vertically. In the time domain, the length of each block is one OFDM symbol, and the 14 symbols make up a slot. In the frequency domain, the height of each block is one sub-channel.

The slot structure illustrated in FIG. 9B is similar to the slot structure illustrated in FIG. 9A, except that the slot structure illustrated in FIG. 9B includes feedback resources. Specifically, two symbols at the end of the slot have been dedicated to the physical sidelink feedback channel (PSFCH). The first PSFCH symbol is a repetition of the second PSFCH symbol for AGC setting. In addition to the gap symbol after the PSSCH, there is a gap symbol after the two PSFCH symbols. Currently, resources for the PSFCH can be configured with a periodicity selected from the set of {0, 1, 2, 4} slots.

The first 13 symbols of a slot in the time domain and the allocated subchannel(s) in the frequency domain form a sidelink resource pool. A sidelink resource pool may include resources for sidelink communication (transmission and/or reception), sidelink positioning (referred to as a resource pool for positioning (RP-P)), or both communication and positioning. A resource pool configured for both communication and positioning is referred to as a "shared" resource pool. In a shared resource pool, the RP-P is indicated by an offset, periodicity, number of consecutive symbols within a slot (e.g., as few as one symbol), and/or the bandwidth within a component carrier (or the bandwidth across multiple component carriers). In addition, the RP-P can be associated with a zone or a distance from a reference location.

A base station (or a UE, depending on the resource allocation mode) can assign, to another UE, one or more resource configurations from the RP-Ps. Additionally or alternatively, a UE (e.g., a relay or a remote UE) can request one or more RP-P configurations, and it can include in the request one or more of the following: (1) its location information (or zone identifier), (2) periodicity, (3) bandwidth, (4) offset. (5) number of symbols, and (6) whether a configuration with "low interference" is needed (which can be determined through an assigned quality of service (QOS) or priority).

A base station or a UE can configure/assign rate matching resources or RP-P for rate matching and/or muting to a sidelink UE such that when a collision exists between the assigned resources and another resource pool that contains data (PSSCH) and/or control (PSCCH), the sidelink UE is expected to rate match, mute, and/or puncture the data, DMRS, and/or CSI-RS within the colliding resources. This would enable orthogonalization between positioning and data transmissions for increased coverage of PRS signals.

Figure 10:
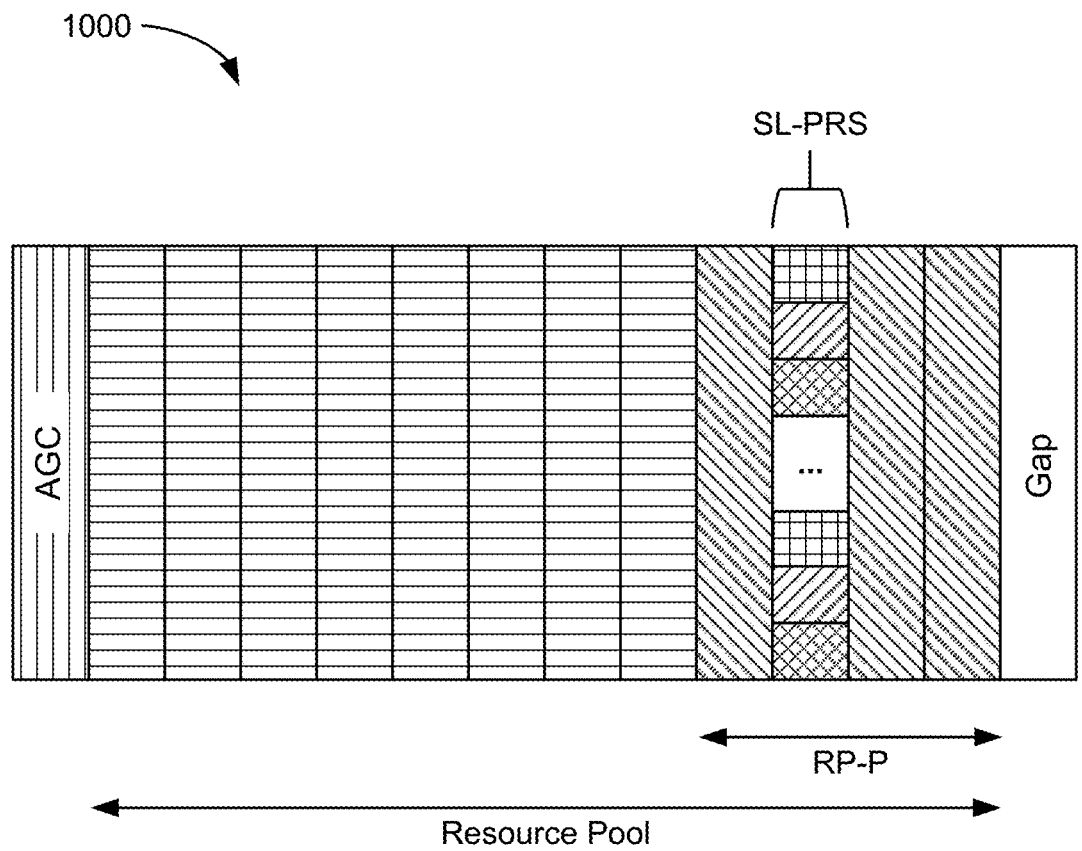
FIG. 10 is a diagram illustrating an example of a resource pool for positioning configured within a sidelink resource pool for communication, according to aspects of the disclosure.

FIG. 10 is a diagram 1000 illustrating an example of a resource pool for positioning configured within a sidelink resource pool for communication (i.e., a shared resource pool), according to aspects of the disclosure. In the example of FIG. 10, time is represented horizontally and frequency is represented vertically. In the time domain, the length of each block is an orthogonal frequency division multiplexing (OFDM) symbol, and the 14 symbols make up a slot. In the frequency domain, the height of each block is a sub-channel.

In the example of FIG. 10, the entire slot (except for the first and last symbols) can be a resource pool for sidelink communication. That is, any of the symbols other than the first and last can be allocated for sidelink communication. However, an RP-P is allocated in the last four pre-gap symbols of the slot. As such, non-sidelink positioning data, such as user data (PSSCH), CSI-RS, and control information, can only be transmitted in the first eight post-AGC symbols and not in the last four pre-gap symbols to prevent a collision with the configured RP-P. The non-sidelink positioning data that would otherwise be transmitted in the last four pre-gap symbols can be punctured or muted, or the non-sidelink data that would normally span more than the eight post-AGC symbols can be rate matched to fit into the eight post-AGC symbols.

Sidelink positioning reference signals (SL-PRS) have been defined to enable sidelink positioning procedures among UEs. Like a downlink PRS (DL-PRS), an SL-PRS resource is composed of one or more resource elements (i.e., one OFDM symbol in the time domain and one subcarrier in the frequency domain). SL-PRS resources have been designed with a comb-based pattern to enable fast Fourier transform (FFT)-based processing at the receiver. SL-PRS resources are composed of unstaggered, or only partially staggered, resource elements in the frequency domain to provide small time of arrival (TOA) uncertainty and reduced overhead of each SL-PRS resource. SL-PRS may also be associated with specific RP-Ps (e.g., certain SL-PRS may be allocated in certain RP-Ps). SL-PRS have also been defined with intra-slot repetition (not shown in FIG. 10) to allow for combining gains (if needed). There may also be inter-UE coordination of RP-Ps to provide for dynamic SL-PRS and data multiplexing while minimizing SL-PRS collisions.

Figure 11:
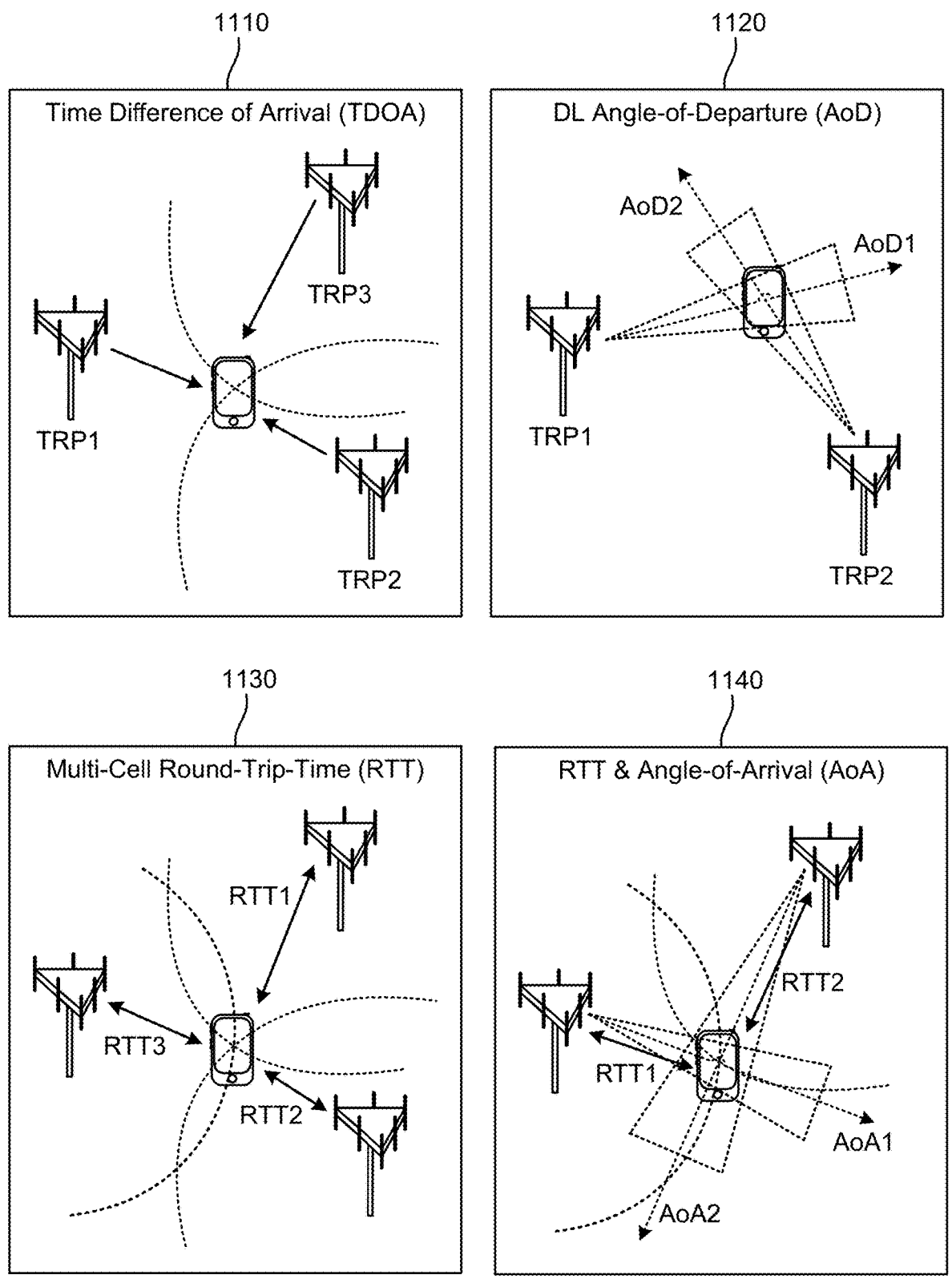
FIG. 11 illustrates examples of various positioning methods supported in New Radio (NR), according to aspects of the disclosure.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. FIG. 11 illustrates examples of various positioning methods, according to aspects of the disclosure. In an OTDOA or DL-TDOA positioning procedure, illustrated by scenario 1110, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, illustrated by scenario 1120, the positioning entity uses a measurement report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE to multiple base stations. Specifically, a UE transmits one or more uplink reference signals that are measured by a reference base station and a plurality of non-reference base stations. Each base station then reports the reception time (referred to as the relative time of arrival (RTOA)) of the reference signal(s) to a positioning entity (e.g., a location server) that knows the locations and relative timing of the involved base stations. Based on the reception-to-reception (Rx-Rx) time difference between the reported RTOA of the reference base station and the reported RTOA of each non-reference base station, the known locations of the base stations, and their known timing offsets, the positioning entity can estimate the location of the UE using TDOA.

For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest slot boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, illustrated by scenario 1130, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy, as illustrated by scenario 1140.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive slots including PRS, periodicity of the consecutive slots including PRS, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

UEs may be classified as RedCap UEs (e.g., wearables, such as smart watches, glasses, rings, etc.) and premium UEs (e.g., smartphones, tablet computers, laptop computers, etc.). RedCap UEs may alternatively be referred to as low-tier UEs, light UEs, or super light UEs. Premium UEs may alternatively be referred to as full-capability UEs or simply UEs. RedCap UEs generally have lower baseband processing capability, fewer antennas (e.g., one receiver antenna as baseline in FR1 or FR2, two receiver antennas optionally), lower operational bandwidth capabilities (e.g., 20 MHZ for FR1 with no supplemental uplink or carrier aggregation, or 50 or 100 MHz for FR2), only half duplex frequency division duplex (HD-FDD) capability, smaller HARQ buffer, reduced physical downlink control channel (PDCCH) monitoring, restricted modulation (e.g., 64 QAM for downlink and 16 QAM for uplink), relaxed processing timeline requirements, and/or lower uplink transmission power compared to premium UEs. Different UE tiers can be differentiated by UE category and/or by UE capability. For example, certain types of UEs may be assigned a classification (e.g., by the original equipment manufacturer (OEM), the applicable wireless communications standards, or the like) of "RedCap" and other types of UEs may be assigned a classification of "premium." Certain tiers of UEs may also report their type (e.g., "RedCap" or "premium") to the network. Additionally, certain resources and/or channels may be dedicated to certain types of UEs.

As will be appreciated, the accuracy of RedCap UE positioning may be limited. For example, a RedCap UE may operate on a reduced bandwidth, such as 5 to 20 MHz for wearable devices and "relaxed" IoT devices (i.e., IoT devices with relaxed, or lower, capability parameters, such as lower throughput, relaxed delay requirements, lower energy consumption, etc.), which results in lower positioning accuracy. As another example, a RedCap UE's receive processing capability may be limited due to its lower cost RF/baseband. As such, the reliability of measurements and positioning computations would be reduced. In addition, such a RedCap UE may not be able to receive multiple PRS from multiple TRPs, further reducing positioning accuracy. As yet another example, the transmit power of a RedCap UE may be reduced, meaning there would be a lower quality of uplink measurements for RedCap UE positioning.

Premium UEs generally have a larger form factor and are costlier than RedCap UEs, and have more features and capabilities than RedCap UEs. For example, with respect to positioning, a premium UE may operate on the full PRS bandwidth, such as 100 MHZ, and measure PRS from more TRPs than RedCap UEs, both of which result in higher positioning accuracy. As another example, a premium UE's receive processing capability may be higher (e.g., faster) due to its higher-capability RF/baseband. In addition, the transmit power of a premium UE may be higher than that of a RedCap UE. As such, the reliability of measurements and positioning computations would be increased.

Figure 12A:
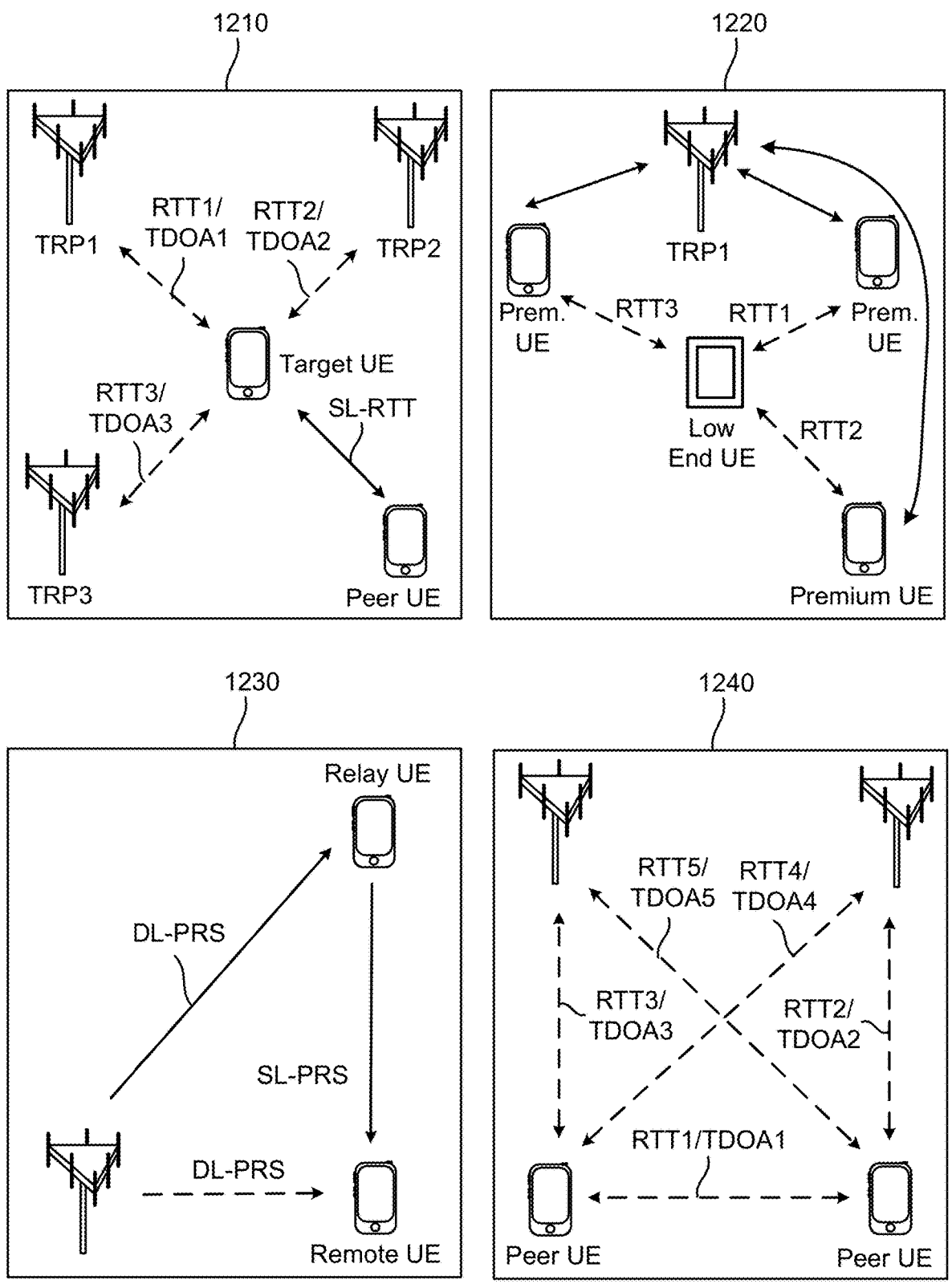
FIGS. 12A and 12B illustrate various scenarios of interest for sidelink-only or joint Uu and sidelink positioning, according to aspects of the disclosure.

NR supports, or enables, various sidelink positioning techniques. FIG. 12A illustrates various scenarios of interest for sidelink-only or joint Uu and sidelink positioning, according to aspects of the disclosure. In scenario 1210, at least one peer UE with a known location can improve the Uu-based positioning (e.g., multi-cell round-trip-time (RTT), downlink time difference of arrival (DL-TDOA), etc.) of a target UE by providing an additional anchor (e.g., using sidelink RTT (SL-RTT)). In scenario 1220, a low-end (e.g., reduced capacity, or "RedCap") target UE may obtain the assistance of premium UEs to determine its location using, e.g., sidelink positioning and ranging procedures with the premium UEs. Compared to the low-end UE, the premium UEs may have more capabilities, such as more sensors, a faster processor, more memory, more antenna elements, higher transmit power capability, access to additional frequency bands, or any combination thereof. In scenario 1230, a relay UE (e.g., with a known location) participates in the positioning estimation of a remote UE without performing uplink positioning reference signal (PRS) transmission over the Uu interface. Scenario 1240 illustrates the joint positioning of multiple UEs. Specifically, in scenario 1240, two UEs with unknown positions can be jointly located in non-line-of-sight (NLOS) conditions by utilizing constraints from nearby UEs.

Figure 12B:
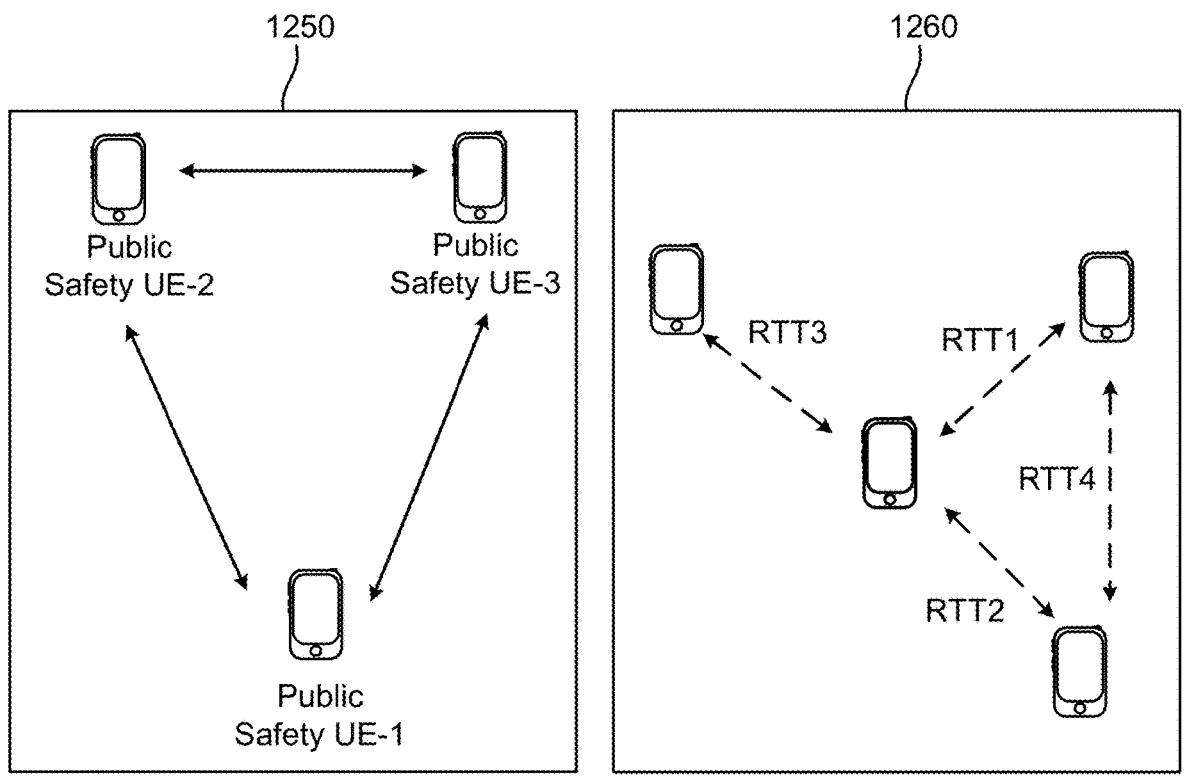

FIG. 12B illustrates additional scenarios of interest for sidelink-only or joint Uu and sidelink positioning, according to aspects of the disclosure. In scenario 1250, UEs used for public safety (e.g., by police, firefighters, and/or the like) may perform peer-to-peer (P2P) positioning and ranging for public safety and other uses. For example, in scenario 1250, the public safety UEs may be out of coverage of a network and determine a location or a relative distance and a relative position among the public safety UEs using sidelink positioning techniques. Similarly, scenario 1260 shows multiple UEs that are out of coverage and determine a location or a relative distance and a relative position using sidelink positioning techniques, such as SL-RTT.

Figure 13:
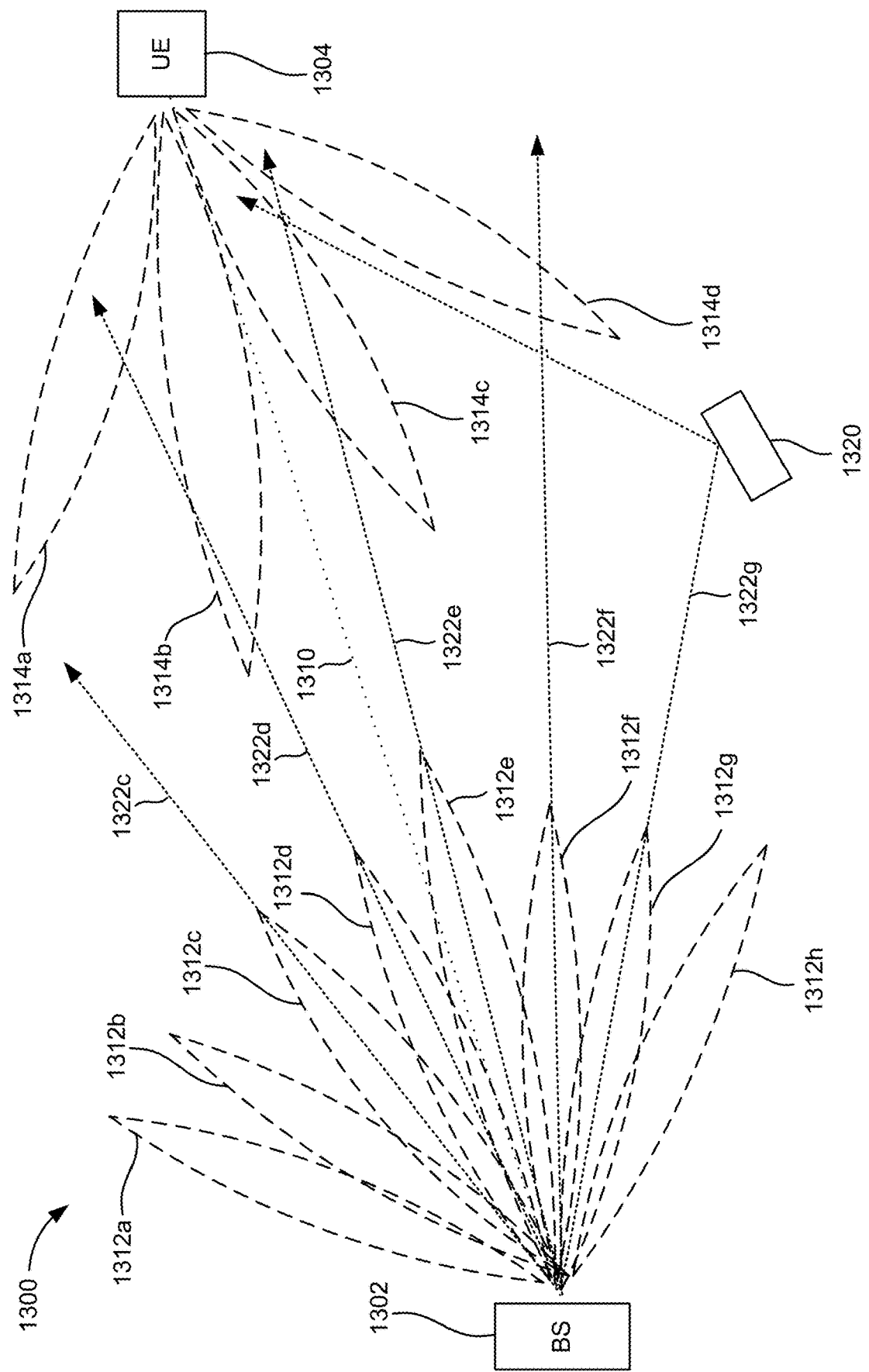
FIG. 13 is a diagram illustrating an example base station in communication with an example UE, according to aspects of the disclosure.

FIG. 13 is a diagram 1300 illustrating a base station (BS) 1302 (which may correspond to any of the base stations described herein) in communication with a UE 1304 (which may correspond to any of the UEs described herein). Referring to FIG. 13, the base station 1302 may transmit a beamformed signal to the UE 1304 on one or more transmit beams 1312a, 1312b, 1312c, 1312d, 1312e, 1312f, 1312g. 1312h (collectively, beams 1312), each having a beam identifier that can be used by the UE 1304 to identify the respective beam. Where the base station 1302 is beamforming towards the UE 1304 with a single array of antennas (e.g., a single TRP/cell), the base station 1302 may perform a "beam sweep" by transmitting first beam 1312a, then beam 1312b, and so on until lastly transmitting beam 1312h. Alternatively, the base station 1302 may transmit beams 1312 in some pattern, such as beam 1312a, then beam 1312h, then beam 1312b, then beam 1312g, and so on. Where the base station 1302 is beamforming towards the UE 1304 using multiple arrays of antennas (e.g., multiple TRPs/cells), each antenna array may perform a beam sweep of a subset of the beams 1312. Alternatively, each of beams 1312 may correspond to a single antenna or antenna array.

FIG. 13 further illustrates the paths 1322c. 1322d, 1322e, 1322f, and 1322g followed by the beamformed signal transmitted on beams 1312c, 1312d, 1312e, 1312f, and 1312g, respectively. Each path 1322c, 1322d, 1322e, 1322f, 1322g may correspond to a single "multipath" or, due to the propagation characteristics of radio frequency (RF) signals through the environment, may be comprised of a plurality (a cluster) of "multipaths." Note that although only the paths 1322c-1322g for beams 1312c-1312g are shown, this is for simplicity, and the signal transmitted on each of beams 1312 will follow some path. In the example shown, the paths 1322c, 1322d, 1322e, and 1322f are straight lines, while path 1322g reflects off an obstacle 1320 (e.g., a building, vehicle, terrain feature, etc.).

The UE 1304 may receive the beamformed signal from the base station 1302 on one or more receive beams 1314a, 1314b, 1314c, 1314d (collectively, beams 1314). Note that for simplicity, the beams illustrated in FIG. 13 represent either transmit beams or receive beams, depending on which of the base station 1302 and the UE 1304 is transmitting and which is receiving. Thus, the UE 1304 may also transmit a beamformed signal to the base station 1302 on one or more of the beams 1314, and the base station 1302 may receive the beamformed signal from the UE 1304 on one or more of the beams 1312.

In an aspect, the base station 1302 and the UE 1304 may perform beam training to align the transmit and receive beams of the base station 1302 and the UE 1304. For example, depending on environmental conditions and other factors, the base station 1302 and the UE 1304 may determine that the best transmit and receive beams are 1312d and 1314b, respectively, or beams 1312e and 1314c, respectively. The direction of the best transmit beam for the base station 1302 may or may not be the same as the direction of the best receive beam, and likewise, the direction of the best receive beam for the UE 1304 may or may not be the same as the direction of the best transmit beam. Note, however, that aligning the transmit and receive beams is not necessary to perform a downlink angle-of-departure (DL-AoD) or uplink angle-of-arrival (UL-AoA) positioning procedure.

To perform a DL-AoD positioning procedure, the base station 1302 may transmit reference signals (e.g., PRS, CRS, TRS, CSI-RS, PSS, SSS, etc.) to the UE 1304 on one or more of beams 1312, with each beam having a different transmit angle. The different transmit angles of the beams will result in different received signal strengths (e.g., RSRP, RSRQ. SINR, etc.) at the UE 1304. Specifically, the received signal strength will be lower for transmit beams 1312 that are further from the line of sight (LOS) path 1310 between the base station 1302 and the UE 1304 than for transmit beams 1312 that are closer to the LOS path 1310.

In the example of FIG. 13, if the base station 1302 transmits reference signals to the UE 1304 on beams 1312c. 1312d, 1312e, 1312f, and 1312g, then transmit beam 1312e is best aligned with the LOS path 1310, while transmit beams 1312c, 1312d, 1312f, and 1312g are not. As such, beam 1312e is likely to have a higher received signal strength at the UE 1304 than beams 1312c, 1312d, 1312f, and 1312g. Note that the reference signals transmitted on some beams (e.g., beams 1312c and/or 1312f) may not reach the UE 1304, or energy reaching the UE 1304 from these beams may be so low that the energy may not be detectable or at least can be ignored.

The UE 1304 can report the received signal strength, and optionally, the associated measurement quality, of each measured transmit beam 1312c-1312g to the base station 1302, or alternatively, the identity of the transmit beam having the highest received signal strength (beam 1312e in the example of FIG. 13). Alternatively or additionally, if the UE 1304 is also engaged in a round-trip-time (RTT) or time-difference of arrival (TDOA) positioning session with at least one base station 1302 or a plurality of base stations 1302, respectively, the UE 1304 can report reception-to-transmission (Rx-Tx) time difference or reference signal time difference (RSTD) measurements (and optionally the associated measurement qualities), respectively, to the serving base station 1302 or other positioning entity. In any case, the positioning entity (e.g., the base station 1302, a location server, a third-party client, UE 1304, etc.) can estimate the angle from the base station 1302 to the UE 1304 as the AoD of the transmit beam having the highest received signal strength at the UE 1304, here, transmit beam 1312c.

In one aspect of DL-AoD-based positioning, where there is only one involved base station 1302, the base station 1302 and the UE 1304 can perform a round-trip-time (RTT) procedure to determine the distance between the base station 1302 and the UE 1304. Thus, the positioning entity can determine both the direction to the UE 1304 (using DL-AoD positioning) and the distance to the UE 1304 (using RTT positioning) to estimate the location of the UE 1304. Note that the AoD of the transmit beam having the highest received signal strength does not necessarily lie along the LOS path 1310, as shown in FIG. 13. However, for DL-AoD-based positioning purposes, it is assumed to do so.

In another aspect of DL-AoD-based positioning, where there are multiple involved base stations 1302, each involved base station 1302 can report, to the serving base station 1302, the determined AoD from the respective base station 1302 to the UE 1304, or the RSRP measurements. The serving base station 1302 may then report the AoDs or RSRP measurements from the other involved base station(s) 1312 to the positioning entity (e.g., UE 1304 for UE-based positioning or a location server for UE-assisted positioning). With this information, and knowledge of the base stations' 1302 geographic locations, the positioning entity can estimate a location of the UE 1304 as the intersection of the determined AoDs. There should be at least two involved base stations 1302 for a two-dimensional (2D) location solution, but as will be appreciated, the more base stations 1302 that are involved in the positioning procedure, the more accurate the estimated location of the UE 1304 will be.

To perform an UL-AoA positioning procedure, the UE 1304 transmits uplink reference signals (e.g., UL-PRS, SRS, DMRS, etc.) to the base station 1302 on one or more of uplink transmit beams 1314. The base station 1302 receives the uplink reference signals on one or more of uplink receive beams 1312. The base station 1302 determines the angle of the best receive beams 1312 used to receive the one or more reference signals from the UE 1304 as the AoA from the UE 1304 to itself. Specifically, each of the receive beams 1312 will result in a different received signal strength (e.g., RSRP. RSRQ, SINR, etc.) of the one or more reference signals at the base station 1302. Further, the channel impulse response of the one or more reference signals will be smaller for receive beams 1312 that are further from the actual LOS path 1310 between the base station 1302 and the UE 1304 than for receive beams 1312 that are closer to the LOS path 1310. Likewise, the received signal strength will be lower for receive beams 1312 that are further from the LOS path 1310 than for receive beams 1312 that are closer to the LOS path 1310. As such, the base station 1302 identifies the receive beam 1312 that results in the highest received signal strength and, optionally, the strongest channel impulse response, and estimates the angle from itself to the UE 1304 as the AoA of that receive beam 1312. Note that as with DL-AoD-based positioning, the AoA of the receive beam 1312 resulting in the highest received signal strength (and strongest channel impulse response if measured) does not necessarily lie along the LOS path 1310. However, for UL-AoA-based positioning purposes in FR2, it may be assumed to do so.

Note that while the UE 1304 is illustrated as being capable of beamforming, this is not necessary for DL-AoD and UL-AoA positioning procedures. Rather, the UE 1304 may receive and transmit on an omni-directional antenna.

Where the UE 1304 is estimating its location (i.e., the UE is the positioning entity), it needs to obtain the geographic location of the base station 1302. The UE 1304 may obtain the location from, for example, the base station 1302 itself or a location server (e.g., location server 230, LMF 270, SLP 272). With the knowledge of the distance to the base station 1302 (based on the RTT or timing advance), the angle between the base station 1302 and the UE 1304 (based on the UL-AoA of the best receive beam 1312), and the known geographic location of the base station 1302, the UE 1304 can estimate its location.

Alternatively, where a positioning entity, such as the base station 1302 or a location server, is estimating the location of the UE 1304, the base station 1302 reports the AoA of the receive beam 1312 resulting in the highest received signal strength (and optionally strongest channel impulse response) of the reference signals received from the UE 1304, or all received signal strengths and channel impulse responses for all receive beams 1312 (which allows the positioning entity to determine the best receive beam 1312). The base station 1302 may additionally report the Rx-Tx time difference to the UE 1304. The positioning entity can then estimate the location of the UE 1304 based on the UE's 1304 distance to the base station 1302, the AoA of the identified receive beam 1312, and the known geographic location of the base station 1302.

At a high-level, carrier phase-based positioning relies on the idea of mixing a reference signal (generated at the transmitter) with its replica at the receiver to generate a mixed signal with low and high-frequency components. The high-frequency component can be filtered-out (at the receiver), leaving only a carrier signal whose phase is the difference between the phase of the transmitted signal and its replica at the receiver.

In 5G NR, a position reference unit (PRU) is a UE with a known location, which may operate similarly to a fixed network node (e.g., TRP, gNB, etc.) for position estimation. PRUs may be used to potentially remove common errors sources (e.g., geometry inaccuracy, clock, multipath, atmosphere, etc.), which may improve position estimation accuracy.

Figure 14:
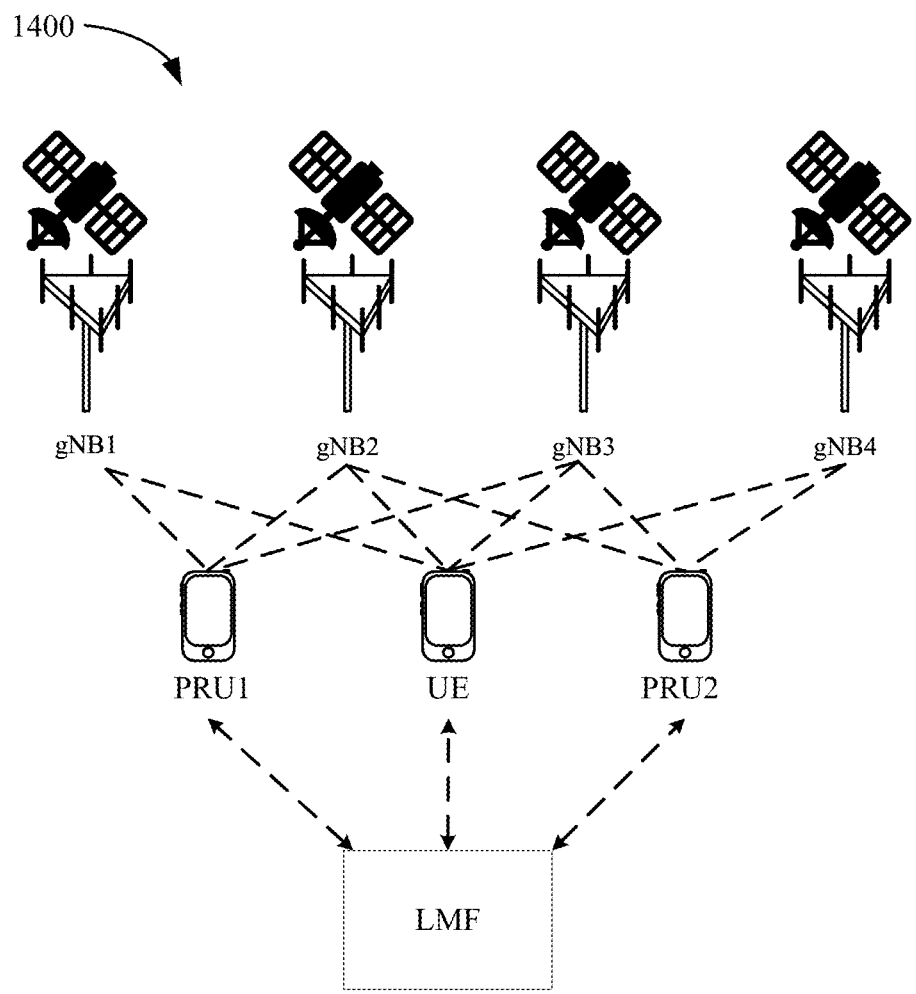
FIG. 14 illustrates a position estimation scheme, in accordance with aspects of the disclosure.

FIG. 14 illustrates a position estimation scheme 1400, in accordance with aspects of the disclosure. In FIG. 14, gNBs 1-4, PRUs 1-2, a target UE, and an LMF are depicted.

Referring to FIG. 14, in some designs, for UE-based estimation, PRUs 1-2 may send correction data to the LMF, which may then forward some or all of the correction data to the UE. In some designs, the correction data may relate to various measurement types, such as clock offset, RSTD error, AoA/AOD offset, carrier phase error/offset, offset of difference of carrier phase (RSCP/RSCPD), etc., between two TRPs (in this case, gNBs). In some designs, a PRU may serve one UE. In other designs, multiple PRUs may be deployed in a region and may serve multiple UEs.

There are multiple factors (error sources) could impact the carrier phase measurement quality, such as, e.g.:
Node orientation accuracy.
Node beam shape characterization accuracy (For AoA/AOD estimation).
Node AoA/AOD estimation accuracy (or related measurement accuracy, e.g., RSRP)
Bandwidth
SNR
Phase center offset characterization
Phase coherency quality (e.g., The Measurement entity (ME) should maintain phase coherency at least within one PRS instance. Any phase jitter could impact accuracy, The Tx node also need to maintain phase continuity. The ME may be able to monitor this.)

In some designs, any indication of carrier phase measurement quality may be based on some or all of the above-noted factors, and measurement entity (e.g., TRP, PRU, UE) may send the carrier phase measurement quality to the position estimation entity.

Aspects of the disclosure are directed communicating a carrier phase measurement in conjunction with an indication of error information associated with the carrier phase measurement. A position estimation entity may factor the carrier phase measurement into position estimation of a user equipment (UE). Such aspects may provide various technical advantages, such as improved position estimation accuracy, reduced position estimation latency, and so on.

Figure 15:
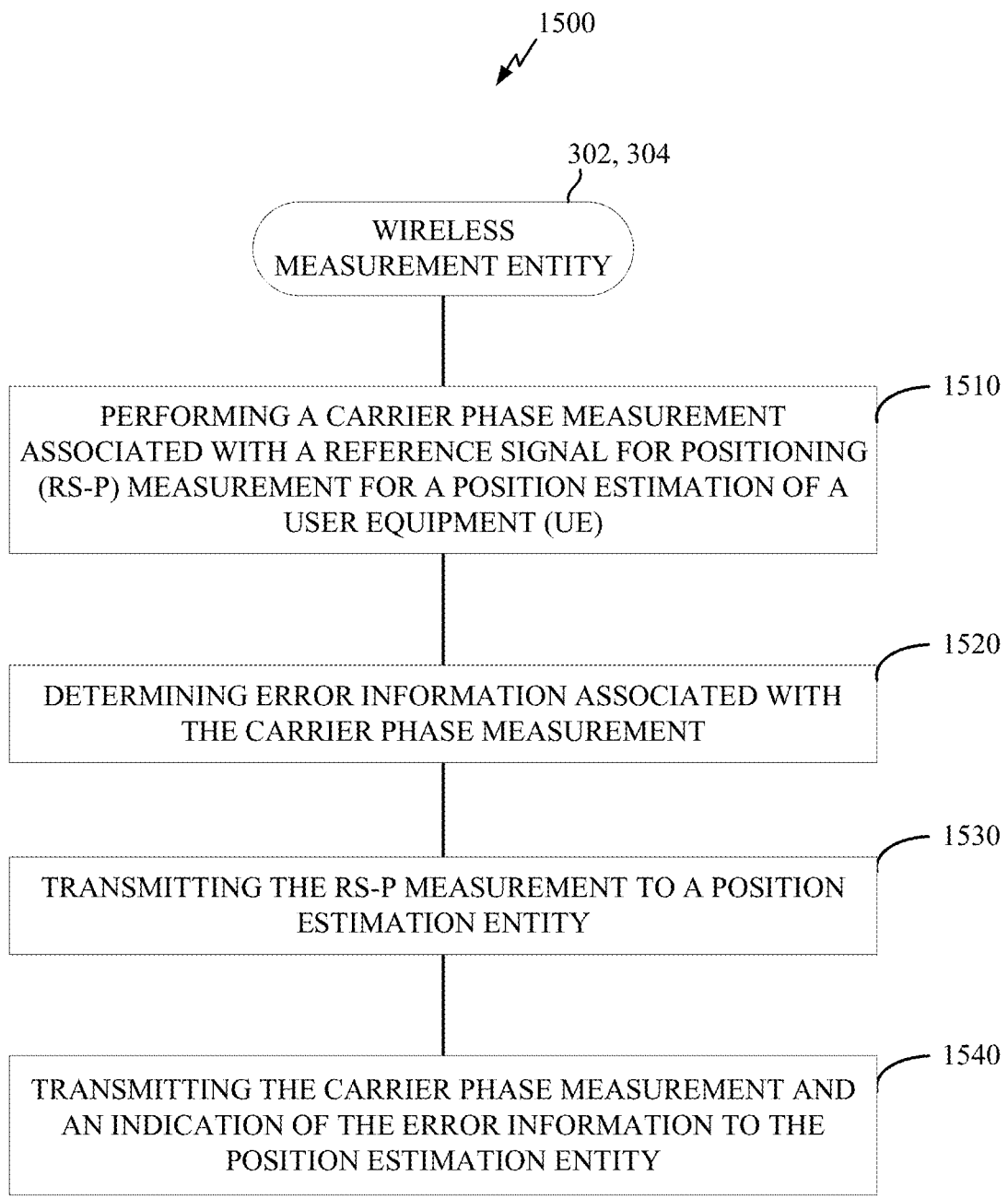
FIG. 15 illustrates an exemplary process of communications according to an aspect of the disclosure.

FIG. 15 illustrates an exemplary process 1500 of communications according to an aspect of the disclosure. The process 1500 of FIG. 15 is performed by wireless measurement entity. In some designs, the wireless measurement entity may correspond to a wireless network component (e.g., gNB 304 or O-RAN component or PRU, etc.). In other designs, the wireless measurement entity may correspond to a UE, such as UE 302.

Referring to FIG. 15, at 1510, the wireless measurement entity (e.g., receiver 312 or 322, or 352 or 362, processor(s) 332 or 384 or 394, carrier phase component 342 or 388 or 398, etc.) performs a carrier phase measurement associated with a reference signal for positioning (RS-P) measurement for a position estimation of a user equipment (UE). For example, the carrier phase measurement may comprise a measurement at a central frequency of PFL bandwidth, or an intra-PFL carrier phase measurement, or measurement(s) associated with an aggregated PFL bandwidth.

Referring to FIG. 15, at 1520, the wireless measurement entity (e.g., processor(s) 332 or 384 or 394, carrier phase component 342 or 388 or 398, etc.) determines error information associated with the carrier phase measurement.

Referring to FIG. 15, at 1530, the wireless measurement entity (e.g., transmitter 314 or 324 or 354 or 364, network transceiver(s) 380, etc.) transmits the RS-P measurement to a position estimation entity.

Referring to FIG. 15, at 1540, the wireless measurement entity (e.g., transmitter 314 or 324 or 354 or 364, network transceiver(s) 380, etc.) transmits the carrier phase measurement and an indication of the error information to the position estimation entity.

Figure 16:
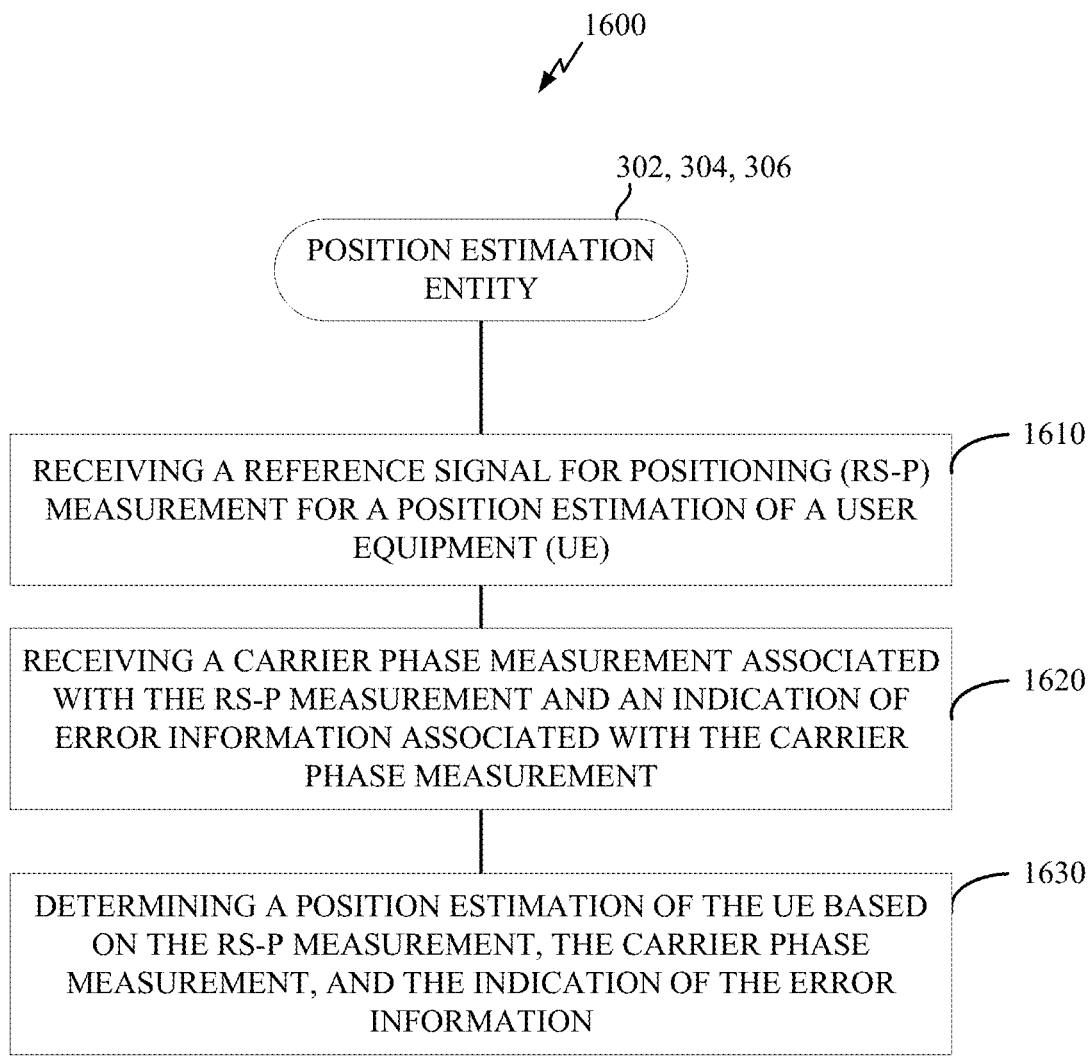
FIG. 16 illustrates an exemplary process of communications according to an aspect of the disclosure.

FIG. 16 illustrates an exemplary process 1600 of communications according to an aspect of the disclosure. The process 1600 of FIG. 16 is performed by a position estimation entity. In some designs, the position estimation entity may correspond to a network component (e.g., an LMF integrated at gNB/BS 304/NTN entity or O-RAN component or a remote location server such as network entity 306, etc.). In other designs, the position estimation entity may correspond to another UE (e.g., sidelink anchor UE) or to the target UE itself (e.g., for UE-based position estimation, in which case any Rx/Tx operations between the UE and the position estimation entity may correspond to transfer of information between different logical components of the UE over a data bus, etc.) or to the wireless measurement entity itself (e.g., in which case any Rx/Tx operations between the wireless measurement entity and the position estimation entity may correspond to transfer of information between different logical components of the wireless measurement entity over a data bus, etc.). In a further aspect, the process 1600 of FIG. 16 at the position estimation entity may correspond to a process performed in parallel with the process 1500 of FIG. 15 at the wireless measurement entity.

Referring to FIG. 16, at 1610, the position estimation entity (e.g., receiver 312 or 322 or 352 or 352 or data bus 334 or data bus 382 or 392 or network transceiver(s) 380 or 390, etc.) receives a reference signal for positioning (RS-P) measurement for a position estimation of a user equipment (UE).

Referring to FIG. 16, at 1620, the position estimation entity (e.g., receiver 312 or 322 or 352 or 352 or data bus 334 or data bus 382 or 392 or network transceiver(s) 380 or 390, etc.) receives a carrier phase measurement associated with the RS-P measurement and an indication of error information associated with the carrier phase measurement.

Referring to FIG. 16, at 1630, the position estimation entity (e.g., processor(s) 332 or 384 or 394, carrier phase component 342 or 388 or 398, etc.) determines a position estimation of the UE based on the RS-P measurement, the carrier phase measurement, and the indication of the error information.

Referring to FIGS. 15-16, in some designs, the error information comprises an aggregate error associated with the carrier phase measurement. In an aspect, the wireless measurement entity may associate the aggregate error with one of a set of carrier phase error groups (CPEGs), and the indication indicates the associated CPEG. In an aspect, the position estimation entity may likewise associate the carrier phase measurement with the CPEG based on the indication. In a further aspect, each CPEG in the set of CPEGs is associated with a different error profile, and the aggregate error matches the error profile of the associated CPEG. In a further aspect, the error profile for each CPEG in the set of CPEGs is defined based on error mean, error variance, a higher order statistic, a distribution model, an integer level indicator, or any combination thereof. In a further aspect, the indication comprises a CPEG identifier (ID) of the CPEG. In a further aspect, the wireless measurement entity transmits (and the position estimation entity further receives) a CPEG capability associated with the wireless measurement entity to the position estimation entity. In an aspect, the position estimation entity requests the CPEG for carrier phase measurement reporting by the position estimation entity based on the CPEG capability.

Referring to FIGS. 15-16, in some designs, the error information comprises statistical information associated with one or more error sources that contribute to an aggregate error associated with the carrier phase measurement. In some designs, the statistical information comprises one or more error types. In some designs, the statistical information is appended to measurement reports associated with a particular measurement type.

Referring to FIGS. 15-16, in some designs, the RS-P measurement comprises an angle of arrival (AoA) measurement or an angle of departure (AoD) measurement.

Referring to FIGS. 15-16, in some designs, the wireless measurement entity receives (and the position estimation entity further transmits) location assistance data that is based on carrier phase error information reported by the wireless measurement entity, one or more other wireless measurement entities, or a combination thereof.

Referring to FIGS. 15-16, in some designs, the error information comprises timing error information, angle error information, and phase error information. In some designs, the timing error information, the angle error information, and the phase error information are reported independently. In some designs, the wireless measurement entity transmits (and the position estimation entity further receives) the error information based on a reporting rule that requires at least one first type of error information to be transmitted to the position estimation entity if at least one second type of error information is transmitted to the position estimation entity, Referring to FIGS. 15-16, in some designs, the indication of the error information is transmitted in the same measurement report as the RS-P measurement. In some designs, the indication of the error information is transmitted in a first measurement report and the RS-P measurement is transmitted in a second measurement report, and the first measurement report comprises a timestamp or subframe identifier or slot identifier of an RS-P occasion associated with the RS-P measurement.

Referring to FIGS. 15-16, in a specific example, similar to transmit error group (TEG) (similar to observation space representation), carrier phase measurement (RSCP, RSCPD) quality indication can be done using CPEG. In some designs, RSCP/RSCPD measurements can be grouped in to CPEGs. Each measurement may be tagged with one CPEG-ID. In each CPEG, measurements with similar error properties are grouped. For example, if ME suffers from a phase jitter within one PRS instance, then ME can group the measurements before the jitter as CPEG1, and after the jitter as CPEG2.

In terms of impact to the relevant 3GPP specification, the 3GPP specification may specify a max number of CPEGs/CPEG IDs/CPEG properties (optional). In some designs, each CPEG may further contain some CPEG properties (statistical properties information) of the error. In some designs, statistical properties includes any combination of mean/variance/higher order statistic/distribution model/integer level indicator (e.g., level 1-8), etc.

In some designs, the error may be defined in the unit of degrees or radians. In some designs, ME and position estimation entity (or PE) may exchange their capability through capability related message (request/report). In some designs, after PE receives RS-P measurements, PE may use RS-P measurements associated with carrier phase measurements in the same CPEG ID for location estimate.

Referring to FIGS. 15-16, in another specific example, detailed source-specific error information may be provided instead of just aggregate error information, e.g.:

Within each CPEG, statistics information of each error source can be added.

Instead of CPEG, the statistics information of each error source can be added directly to the RSCP/RSCPD measurements IEs (e.g., instead of CPEG, add more IEs of each error types and optional error statistics).

Some error information may be added as an additional information to certain measurements (e.g., AoA/AOD estimation is not in current 3GPP specification, and only RSRPs measurements are reported. However, in some designs, it is important for the ME to estimate the AoA and/or AoD for phase center offset compensation. Also, ME may further add AoA/AOD estimates and integrate into the carrier phase measurement report. In that case, AoA/AOD measurement quality can be added under the its measurement IEs, instead of CP measurement IE).

Some error quality info may be added in the assistance data (e.g., ME and Tx node may send beam shape information and phase center offset characterization to the PE. The quality of these assistance data generally will not change rapidly over time. Therefore, in some designs, it makes sense to add quality/resolution related info to the assistance data.)

Referring to FIGS. 15-16, in another specific example, a relationship between timing quality, angle quality and phase quality may be measured/reported and factored into position estimation, e.g.:

Option 1: Timing quality, angle quality and phase quality may be reported independently Option 2: A reporting rule may be defined whereby if one error type is reported, then other error type(s) are also reported. For example, if carrier phase (CP) measurements and/or angle measurements are added to timing or angle measurement, then the added measurement(s) are associated with the same PRS resource/resource-set/TRP, and the measurements may share the same quality properties. For example, the carrier phase or angle may reuse the independent measurement quality instead to reduce the overhead.

In some designs, both Options 1 and 2 may apply for integrated measurement report (e.g. TDOA+CP) or separate measurement reports (CP only). In some designs, if Option 2 is used (i.e., separate measurement reports), ME may add PRS instance and/or timestamp related information to associate the separate reports (e.g., the frame/slot IDs of the PRS measured in the report).

Referring to FIGS. 15-16, in another specific example, the IE for UL AoA measurements may be as follows, e.g.:

TABLE 1

UL AoA Information Element

| IE/Group Name | Presence | Range | IE Type and Reference | Semantics Description |
|---|---|---|---|---|
| Azimuth Angle of Arrival | M | | INTEGER(0 . . . 3599) | TS 38.133[16] |
| Zenith Angle of Arrival | O | | INTEGER(0 . . . 1799) | TS 38.133[16] |

TABLE 1-continued

UL AoA Information Element

| IE/Group Name | Presence | Range | IE Type and Reference | Semantics Description |
|---|---|---|---|---|
| LCS to GCS Translation | | 0 . . . 1 | | If absent, the Azimuth and Zenith are provided in GCS |
| >Alpha | M | | INTEGER(0 . . . 3599) | |
| >Beta | M | | INTEGER(0 . . . 3599) | |
| >Gamma | M | | INTEGER(0 . . . 3599) | |

In an example, ME may report AoA/AOD similar to the approach set forth in IE for UL AoA measurements, e.g.:

AoA/AOD Measurement IE
 Azimuth and zenith AoA or AoD
 LCS to GCS info (alpha, beta, gamma)
 Measurement quality
  Range/mean/variance can be defined in deg as TS.38.133

In some designs, ME may report CP measurements similar to the approach set forth in IE for UL AoA measurements, e.g.:

RSCP/RSCPD Measurement IE
 Carrier phase
 Resolution of carrier phase measurement
  Measurement quality
   Range/mean/variance can e defined in deg as TS.38.133

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of operating a wireless measurement entity, comprising: performing a carrier phase measurement associated with a reference signal for positioning (RS-P) measurement for a position estimation of a user equipment (UE); determining error information associated with the carrier phase measurement; transmitting the RS-P measurement to a position estimation entity; and transmitting the carrier phase measurement and an indication of the error information to the position estimation entity.

Clause 2. The method of clause 1, wherein the error information comprises an aggregate error associated with the carrier phase measurement.

Clause 3. The method of clause 2, further comprising: associating the aggregate error with one of a set of carrier phase error groups (CPEGs), wherein the indication indicates the associated CPEG.

Clause 4. The method of clause 3, wherein each CPEG in the set of CPEGs is associated with a different error profile, and wherein the aggregate error matches the error profile of the associated CPEG.

Clause 5. The method of clause 4, wherein the error profile for each CPEG in the set of CPEGs is defined based on error mean, error variance, a higher order statistic, a distribution model, an integer level indicator, or any combination thereof.

Clause 6. The method of any of clauses 3 to 5, wherein the indication comprises a CPEG identifier (ID) of the CPEG.

Clause 7. The method of any of clauses 3 to 6, further comprising: transmitting a CPEG capability associated with the wireless measurement entity to the position estimation entity, wherein the CPEG is requested for carrier phase measurement reporting by the position estimation entity based on the CPEG capability.

Clause 8. The method of any of clauses 1 to 7, wherein the error information comprises statistical information associated with one or more error sources that contribute to an aggregate error associated with the carrier phase measurement.

Clause 9. The method of clause 8, wherein the statistical information comprises one or more error types.

Clause 10. The method of any of clauses 8 to 9, wherein the statistical information is appended to measurement reports associated with a particular measurement type.

Clause 11. The method of any of clauses 1 to 10, wherein the RS-P measurement comprises an angle of arrival (AoA) measurement or an angle of departure (AoD) measurement.

Clause 12. The method of any of clauses 1 to 11, further comprising: receiving location assistance data that is based on carrier phase error information reported by the wireless measurement entity, one or more other wireless measurement entities, or a combination thereof.

Clause 13. The method of any of clauses 1 to 12, wherein the error information comprises timing error information, angle error information, and phase error information.

Clause 14. The method of clause 13, wherein the timing error information, the angle error information, and the phase error information are reported independently.

Clause 15. The method of any of clauses 13 to 14, wherein the transmitting the error information based on a reporting rule that requires at least one first type of error information to be transmitted to the position estimation entity if at least one second type of error information is transmitted to the position estimation entity.

Clause 16. The method of any of clauses 1 to 15, wherein the indication of the error information is transmitted in the same measurement report as the RS-P measurement.

Clause 17. The method of any of clauses 1 to 16, wherein the indication of the error information is transmitted in a first measurement report and the RS-P measurement is transmitted in a second measurement report, and wherein the first measurement report comprises a timestamp or subframe identifier or slot identifier of an RS-P occasion associated with the RS-P measurement.

Clause 18. A method of operating a position estimation entity, comprising: receiving a reference signal for positioning (RS-P) measurement for a position estimation of a user equipment (UE); receiving a carrier phase measurement associated with the RS-P measurement and an indication of error information associated with the carrier phase measurement; and determining a position estimation of the UE based on the RS-P measurement, the carrier phase measurement, and the indication of the error information.

Clause 19. The method of clause 18, wherein the error information comprises an aggregate error associated with the carrier phase measurement.

Clause 20. The method of clause 19, wherein the indication indicates one of a set of carrier phase error groups (CPEGs).

Clause 21. The method of clause 20, wherein each CPEG in the set of CPEGs is associated with a different error profile, and wherein the aggregate error matches the error profile of the associated CPEG.

Clause 22. The method of clause 21, wherein the error profile for each CPEG in the set of CPEGs is defined based on error mean, error variance, a higher order statistic, a distribution model, an integer level indicator, or any combination thereof.

Clause 23. The method of any of clauses 20 to 22, wherein the indication comprises a CPEG identifier (ID) of the CPEG.

Clause 24. The method of any of clauses 20 to 23, further comprising: receiving a CPEG capability associated with a wireless measurement entity from which the RS-P measurement is received; and requesting the CPEG for carrier phase measurement reporting based on the CPEG capability.

Clause 25. The method of any of clauses 18 to 24, wherein the error information comprises statistical information associated with one or more error sources that contribute to an aggregate error associated with the carrier phase measurement.

Clause 26. The method of clause 25, wherein the statistical information comprises one or more error types.

Clause 27. The method of any of clauses 25 to 26, wherein the statistical information is appended to measurement reports associated with a particular measurement type.

Clause 28. The method of any of clauses 18 to 27, wherein the RS-P measurement comprises an angle of arrival (AoA) measurement or an angle of departure (AoD) measurement.

Clause 29. The method of any of clauses 18 to 28, further comprising: transmitting location assistance data that is based on carrier phase error information reported by a wireless measurement entity from which the RS-P measurement is received, one or more other wireless measurement entities, or a combination thereof.

Clause 30. The method of any of clauses 18 to 29, wherein the error information comprises timing error information, angle error information, and phase error information.

Clause 31. The method of clause 30, wherein the timing error information, the angle error information, and the phase error information are reported independently.

Clause 32. The method of clause 31, wherein the indication of the error information is received based on a reporting rule that requires at least one first type of error information to be transmitted by the wireless measurement entity if at least one second type of error information is transmitted to the position estimation entity.

Clause 33. The method of any of clauses 18 to 32, wherein the indication of the error information is received in the same measurement report as the RS-P measurement.

Clause 34. The method of any of clauses 18 to 33, wherein the indication of the error information is received in a first measurement report and the RS-P measurement is received in a second measurement report, and wherein the first measurement report comprises a timestamp or subframe identifier or slot identifier of an RS-P occasion associated with the RS-P measurement.

Clause 35. A wireless measurement entity, comprising: at least one memory; and at least one processor communicatively coupled to the at least one memory, the at least one processor configured to: perform a carrier phase measurement associated with a reference signal for positioning (RS-P) measurement for a position estimation of a user equipment (UE); determine error information associated with the carrier phase measurement; transmit the RS-P measurement to a position estimation entity; and transmit the carrier phase measurement and an indication of the error information to the position estimation entity.

Clause 36. The wireless measurement entity of clause 35, wherein the error information comprises an aggregate error associated with the carrier phase measurement.

Clause 37. The wireless measurement entity of clause 36, wherein the at least one processor is further configured to: associate the aggregate error with one of a set of carrier phase error groups (CPEGs), wherein the indication indicates the associated CPEG.

Clause 38. The wireless measurement entity of clause 37, wherein each CPEG in the set of CPEGs is associated with a different error profile, and wherein the aggregate error matches the error profile of the associated CPEG.

Clause 39. The wireless measurement entity of clause 38, wherein the error profile for each CPEG in the set of CPEGs is defined based on error mean, error variance, a higher order statistic, a distribution model, an integer level indicator, or any combination thereof.

Clause 40. The wireless measurement entity of any of clauses 37 to 39, wherein the indication comprises a CPEG identifier (ID) of the CPEG.

Clause 41. The wireless measurement entity of any of clauses 37 to 40, wherein the at least one processor is further configured to: transmit a CPEG capability associated with the wireless measurement entity to the position estimation entity, wherein the CPEG is requested for carrier phase measurement reporting by the position estimation entity based on the CPEG capability.

Clause 42. The wireless measurement entity of any of clauses 35 to 41, wherein the error information comprises statistical information associated with one or more error sources that contribute to an aggregate error associated with the carrier phase measurement.

Clause 43. The wireless measurement entity of clause 42, wherein the statistical information comprises one or more error types.

Clause 44. The wireless measurement entity of any of clauses 42 to 43, wherein the statistical information is appended to measurement reports associated with a particular measurement type.

Clause 45. The wireless measurement entity of any of clauses 35 to 44, wherein the RS-P measurement comprises an angle of arrival (AoA) measurement or an angle of departure (AoD) measurement.

Clause 46. The wireless measurement entity of any of clauses 35 to 45, wherein the at least one processor is further configured to: receive location assistance data that is based on carrier phase error information reported by the wireless measurement entity, one or more other wireless measurement entities, or a combination thereof.

Clause 47. The wireless measurement entity of any of clauses 35 to 46, wherein the error information comprises timing error information, angle error information, and phase error information.

Clause 48. The wireless measurement entity of clause 47, wherein the timing error information, the angle error information, and the phase error information are reported independently.

Clause 49. The wireless measurement entity of any of clauses 47 to 48, wherein the transmitting the error information based on a reporting rule that requires at least one first type of error information to be transmitted to the position estimation entity if at least one second type of error information is transmitted to the position estimation entity.

Clause 50. The wireless measurement entity of any of clauses 35 to 49, wherein the indication of the error information is transmitted in the same measurement report as the RS-P measurement.

Clause 51. The wireless measurement entity of any of clauses 35 to 50, wherein the indication of the error information is transmitted in a first measurement report and the RS-P measurement is transmitted in a second measurement report, and wherein the first measurement report comprises a timestamp or subframe identifier or slot identifier of an RS-P occasion associated with the RS-P measurement.

Clause 52. A position estimation entity, comprising: at least one memory; and at least one processor communicatively coupled to the at least one memory, the at least one processor configured to: receive a reference signal for positioning (RS-P) measurement for a position estimation of a user equipment (UE); receive a carrier phase measurement associated with the RS-P measurement and an indication of error information associated with the carrier phase measurement; and determine a position estimation of the UE based on the RS-P measurement, the carrier phase measurement, and the indication of the error information.

Clause 53. The position estimation entity of clause 52, wherein the error information comprises an aggregate error associated with the carrier phase measurement.

Clause 54. The position estimation entity of clause 53, wherein the indication indicates one of a set of carrier phase error groups (CPEGs).

Clause 55. The position estimation entity of clause 54, wherein each CPEG in the set of CPEGs is associated with a different error profile, and wherein the aggregate error matches the error profile of the associated CPEG.

Clause 56. The position estimation entity of clause 55, wherein the error profile for each CPEG in the set of CPEGs is defined based on error mean, error variance, a higher order statistic, a distribution model, an integer level indicator, or any combination thereof.

Clause 57. The position estimation entity of any of clauses 54 to 56, wherein the indication comprises a CPEG identifier (ID) of the CPEG.

Clause 58. The position estimation entity of any of clauses 54 to 57, wherein the at least one processor is further configured to: receive a CPEG capability associated with a wireless measurement entity from which the RS-P measurement is received; and request the CPEG for carrier phase measurement reporting based on the CPEG capability.

Clause 59. The position estimation entity of any of clauses 52 to 58, wherein the error information comprises statistical information associated with one or more error sources that contribute to an aggregate error associated with the carrier phase measurement.

Clause 60. The position estimation entity of clause 59, wherein the statistical information comprises one or more error types.

Clause 61. The position estimation entity of any of clauses 59 to 60, wherein the statistical information is appended to measurement reports associated with a particular measurement type.

Clause 62. The position estimation entity of any of clauses 52 to 61, wherein the RS-P measurement comprises an angle of arrival (AoA) measurement or an angle of departure (AoD) measurement.

Clause 63. The position estimation entity of any of clauses 52 to 62, wherein the at least one processor is further configured to: transmit location assistance data that is based on carrier phase error information reported by a wireless measurement entity from which the RS-P measurement is received, one or more other wireless measurement entities, or a combination thereof.

Clause 64. The position estimation entity of any of clauses 52 to 63, wherein the error information comprises timing error information, angle error information, and phase error information.

Clause 65. The position estimation entity of clause 64, wherein the timing error information, the angle error information, and the phase error information are reported independently.

Clause 66. The position estimation entity of clause 65, wherein the indication of the error information is received based on a reporting rule that requires at least one first type of error information to be transmitted by the wireless measurement entity if at least one second type of error information is transmitted to the position estimation entity.

Clause 67. The position estimation entity of any of clauses 52 to 66, wherein the indication of the error information is received in the same measurement report as the RS-P measurement.

Clause 68. The position estimation entity of any of clauses 52 to 67, wherein the indication of the error information is received in a first measurement report and the RS-P measurement is received in a second measurement report, and wherein the first measurement report comprises a timestamp or subframe identifier or slot identifier of an RS-P occasion associated with the RS-P measurement.

Clause 69. A wireless measurement entity, comprising: means for performing a carrier phase measurement associated with a reference signal for positioning (RS-P) measurement for a position estimation of a user equipment (UE); means for determining error information associated with the carrier phase measurement; means for transmitting the RS-P measurement to a position estimation entity; and means for transmitting the carrier phase measurement and an indication of the error information to the position estimation entity.

Clause 70. The wireless measurement entity of clause 69, wherein the error information comprises an aggregate error associated with the carrier phase measurement.

Clause 71. The wireless measurement entity of clause 70, further comprising: means for associating the aggregate error with one of a set of carrier phase error groups (CPEGs), wherein the indication indicates the associated CPEG.

Clause 72. The wireless measurement entity of clause 71, wherein each CPEG in the set of CPEGs is associated with a different error profile, and wherein the aggregate error matches the error profile of the associated CPEG.

Clause 73. The wireless measurement entity of clause 72, wherein the error profile for each CPEG in the set of CPEGs is defined based on error mean, error variance, a higher order statistic, a distribution model, an integer level indicator, or any combination thereof.

Clause 74. The wireless measurement entity of any of clauses 71 to 73, wherein the indication comprises a CPEG identifier (ID) of the CPEG.

Clause 75. The wireless measurement entity of any of clauses 71 to 74, further comprising: means for transmitting a CPEG capability associated with the wireless measurement entity to the position estimation entity, wherein the CPEG is requested for carrier phase measurement reporting by the position estimation entity based on the CPEG capability.

Clause 76. The wireless measurement entity of any of clauses 69 to 75, wherein the error information comprises statistical information associated with one or more error sources that contribute to an aggregate error associated with the carrier phase measurement.

Clause 77. The wireless measurement entity of clause 76, wherein the statistical information comprises one or more error types.

Clause 78. The wireless measurement entity of any of clauses 76 to 77, wherein the statistical information is appended to measurement reports associated with a particular measurement type.

Clause 79. The wireless measurement entity of any of clauses 69 to 78, wherein the RS-P measurement comprises an angle of arrival (AoA) measurement or an angle of departure (AoD) measurement.

Clause 80. The wireless measurement entity of any of clauses 69 to 79, further comprising: means for receiving location assistance data that is based on carrier phase error information reported by the wireless measurement entity, one or more other wireless measurement entities, or a combination thereof.

Clause 81. The wireless measurement entity of any of clauses 69 to 80, wherein the error information comprises timing error information, angle error information, and phase error information.

Clause 82. The wireless measurement entity of clause 81, wherein the timing error information, the angle error information, and the phase error information are reported independently.

Clause 83. The wireless measurement entity of any of clauses 81 to 82, wherein the transmitting the error information based on a reporting rule that requires at least one first type of error information to be transmitted to the position estimation entity if at least one second type of error information is transmitted to the position estimation entity.

Clause 84. The wireless measurement entity of any of clauses 69 to 83, wherein the indication of the error information is transmitted in the same measurement report as the RS-P measurement.

Clause 85. The wireless measurement entity of any of clauses 69 to 84, wherein the indication of the error information is transmitted in a first measurement report and the RS-P measurement is transmitted in a second measurement report, and wherein the first measurement report comprises a timestamp or subframe identifier or slot identifier of an RS-P occasion associated with the RS-P measurement.

Clause 86. A position estimation entity, comprising: means for receiving a reference signal for positioning (RS-P) measurement for a position estimation of a user equipment (UE); means for receiving a carrier phase measurement associated with the RS-P measurement and an indication of error information associated with the carrier phase measurement; and means for determining a position estimation of the UE based on the RS-P measurement, the carrier phase measurement, and the indication of the error information.

Clause 87. The position estimation entity of clause 86, wherein the error information comprises an aggregate error associated with the carrier phase measurement.

Clause 88. The position estimation entity of clause 87, wherein the indication indicates one of a set of carrier phase error groups (CPEGs).

Clause 89. The position estimation entity of clause 88, wherein each CPEG in the set of CPEGs is associated with a different error profile, and wherein the aggregate error matches the error profile of the associated CPEG.

Clause 90. The position estimation entity of clause 89, wherein the error profile for each CPEG in the set of CPEGs is defined based on error mean, error variance, a higher order statistic, a distribution model, an integer level indicator, or any combination thereof.

Clause 91. The position estimation entity of any of clauses 88 to 90, wherein the indication comprises a CPEG identifier (ID) of the CPEG.

Clause 92. The position estimation entity of any of clauses 88 to 91, further comprising: means for receiving a CPEG capability associated with a wireless measurement entity from which the RS-P measurement is received; and means for requesting the CPEG for carrier phase measurement reporting based on the CPEG capability.

Clause 93. The position estimation entity of any of clauses 86 to 92, wherein the error information comprises statistical information associated with one or more error sources that contribute to an aggregate error associated with the carrier phase measurement.

Clause 94. The position estimation entity of clause 93, wherein the statistical information comprises one or more error types.

Clause 95. The position estimation entity of any of clauses 93 to 94, wherein the statistical information is appended to measurement reports associated with a particular measurement type.

Clause 96. The position estimation entity of any of clauses 86 to 95, wherein the RS-P measurement comprises an angle of arrival (AoA) measurement or an angle of departure (AoD) measurement.

Clause 97. The position estimation entity of any of clauses 86 to 96, further comprising: means for transmitting location assistance data that is based on carrier phase error information reported by a wireless measurement entity from which the RS-P measurement is received, one or more other wireless measurement entities, or a combination thereof.

Clause 98. The position estimation entity of any of clauses 86 to 97, wherein the error information comprises timing error information, angle error information, and phase error information.

Clause 99. The position estimation entity of clause 98, wherein the timing error information, the angle error information, and the phase error information are reported independently.

Clause 100. The position estimation entity of clause 99, wherein the indication of the error information is received based on a reporting rule that requires at least one first type of error information to be transmitted by the wireless measurement entity if at least one second type of error information is transmitted to the position estimation entity.

Clause 101. The position estimation entity of any of clauses 86 to 100, wherein the indication of the error information is received in the same measurement report as the RS-P measurement.

Clause 102. The position estimation entity of any of clauses 86 to 101, wherein the indication of the error information is received in a first measurement report and the RS-P measurement is received in a second measurement report, and wherein the first measurement report comprises a timestamp or subframe identifier or slot identifier of an RS-P occasion associated with the RS-P measurement.

Clause 103. A non-transitory computer-readable medium storing computer-executable instructions that, when executed by a wireless measurement entity, cause the wireless measurement entity to: perform a carrier phase measurement associated with a reference signal for positioning (RS-P) measurement for a position estimation of a user equipment (UE); determine error information associated with the carrier phase measurement; transmit the RS-P measurement to a position estimation entity; and transmit the carrier phase measurement and an indication of the error information to the position estimation entity.

Clause 104. The non-transitory computer-readable medium of clause 103, wherein the error information comprises an aggregate error associated with the carrier phase measurement.

Clause 105. The non-transitory computer-readable medium of clause 104, further comprising computer-executable instructions that, when executed by the wireless measurement entity, cause the wireless measurement entity to: associate the aggregate error with one of a set of carrier phase error groups (CPEGs), wherein the indication indicates the associated CPEG.

Clause 106. The non-transitory computer-readable medium of clause 105, wherein each CPEG in the set of CPEGs is associated with a different error profile, and wherein the aggregate error matches the error profile of the associated CPEG.

Clause 107. The non-transitory computer-readable medium of clause 106, wherein the error profile for each CPEG in the set of CPEGs is defined based on error mean, error variance, a higher order statistic, a distribution model, an integer level indicator, or any combination thereof.

Clause 108. The non-transitory computer-readable medium of any of clauses 105 to 107, wherein the indication comprises a CPEG identifier (ID) of the CPEG.

Clause 109. The non-transitory computer-readable medium of any of clauses 105 to 108, further comprising computer-executable instructions that, when executed by the wireless measurement entity, cause the wireless measurement entity to: transmit a CPEG capability associated with the wireless measurement entity to the position estimation entity, wherein the CPEG is requested for carrier phase measurement reporting by the position estimation entity based on the CPEG capability.

Clause 110. The non-transitory computer-readable medium of any of clauses 103 to 109, wherein the error information comprises statistical information associated with one or more error sources that contribute to an aggregate error associated with the carrier phase measurement.

Clause 111. The non-transitory computer-readable medium of clause 110, wherein the statistical information comprises one or more error types.

Clause 112. The non-transitory computer-readable medium of any of clauses 110 to 111, wherein the statistical information is appended to measurement reports associated with a particular measurement type.

Clause 113. The non-transitory computer-readable medium of any of clauses 103 to 112, wherein the RS-P measurement comprises an angle of arrival (AoA) measurement or an angle of departure (AoD) measurement.

Clause 114. The non-transitory computer-readable medium of any of clauses 103 to 113, further comprising computer-executable instructions that, when executed by the wireless measurement entity, cause the wireless measurement entity to: receive location assistance data that is based on carrier phase error information reported by the wireless measurement entity, one or more other wireless measurement entities, or a combination thereof.

Clause 115. The non-transitory computer-readable medium of any of clauses 103 to 114, wherein the error information comprises timing error information, angle error information, and phase error information.

Clause 116. The non-transitory computer-readable medium of clause 115, wherein the timing error information, the angle error information, and the phase error information are reported independently.

Clause 117. The non-transitory computer-readable medium of any of clauses 115 to 116, wherein the transmitting the error information based on a reporting rule that requires at least one first type of error information to be transmitted to the position estimation entity if at least one second type of error information is transmitted to the position estimation entity.

Clause 118. The non-transitory computer-readable medium of any of clauses 103 to 117, wherein the indication of the error information is transmitted in the same measurement report as the RS-P measurement.

Clause 119. The non-transitory computer-readable medium of any of clauses 103 to 118, wherein the indication of the error information is transmitted in a first measurement report and the RS-P measurement is transmitted in a second measurement report, and wherein the first measurement report comprises a timestamp or subframe identifier or slot identifier of an RS-P occasion associated with the RS-P measurement.

Clause 120. A non-transitory computer-readable medium storing computer-executable instructions that, when executed by a position estimation entity, cause the position estimation entity to: receive a reference signal for positioning (RS-P) measurement for a position estimation of a user equipment (UE); receive a carrier phase measurement associated with the RS-P measurement and an indication of error information associated with the carrier phase measurement; and determine a position estimation of the UE based on the RS-P measurement, the carrier phase measurement, and the indication of the error information.

Clause 121. The non-transitory computer-readable medium of clause 120, wherein the error information comprises an aggregate error associated with the carrier phase measurement.

Clause 122. The non-transitory computer-readable medium of clause 121, wherein the indication indicates one of a set of carrier phase error groups (CPEGs).

Clause 123. The non-transitory computer-readable medium of clause 122, wherein each CPEG in the set of CPEGs is associated with a different error profile, and wherein the aggregate error matches the error profile of the associated CPEG.

Clause 124. The non-transitory computer-readable medium of clause 123, wherein the error profile for each CPEG in the set of CPEGs is defined based on error mean, error variance, a higher order statistic, a distribution model, an integer level indicator, or any combination thereof.

Clause 125. The non-transitory computer-readable medium of any of clauses 122 to 124, wherein the indication comprises a CPEG identifier (ID) of the CPEG.

Clause 126. The non-transitory computer-readable medium of any of clauses 122 to 125, further comprising computer-executable instructions that, when executed by the position estimation entity, cause the position estimation entity to: receive a CPEG capability associated with a wireless measurement entity from which the RS-P measurement is received; and request the CPEG for carrier phase measurement reporting based on the CPEG capability.

Clause 127. The non-transitory computer-readable medium of any of clauses 120 to 126, wherein the error information comprises statistical information associated with one or more error sources that contribute to an aggregate error associated with the carrier phase measurement.

Clause 128. The non-transitory computer-readable medium of clause 127, wherein the statistical information comprises one or more error types.

Clause 129. The non-transitory computer-readable medium of any of clauses 127 to 128, wherein the statistical information is appended to measurement reports associated with a particular measurement type.

Clause 130. The non-transitory computer-readable medium of any of clauses 120 to 129, wherein the RS-P measurement comprises an angle of arrival (AoA) measurement or an angle of departure (AoD) measurement.

Clause 131. The non-transitory computer-readable medium of any of clauses 120 to 130, further comprising computer-executable instructions that, when executed by the position estimation entity, cause the position estimation entity to: transmit location assistance data that is based on carrier phase error information reported by a wireless measurement entity from which the RS-P measurement is received, one or more other wireless measurement entities, or a combination thereof.

Clause 132. The non-transitory computer-readable medium of any of clauses 120 to 131, wherein the error information comprises timing error information, angle error information, and phase error information.

Clause 133. The non-transitory computer-readable medium of clause 132, wherein the timing error information, the angle error information, and the phase error information are reported independently.

Clause 134. The non-transitory computer-readable medium of clause 133, wherein the indication of the error information is received based on a reporting rule that requires at least one first type of error information to be transmitted by the wireless measurement entity if at least one second type of error information is transmitted to the position estimation entity.

Clause 135. The non-transitory computer-readable medium of any of clauses 120 to 134, wherein the indication of the error information is received in the same measurement report as the RS-P measurement.

Clause 136. The non-transitory computer-readable medium of any of clauses 120 to 135, wherein the indication of the error information is received in a first measurement report and the RS-P measurement is received in a second measurement report, and wherein the first measurement report comprises a timestamp or subframe identifier or slot identifier of an RS-P occasion associated with the RS-P measurement.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a wireless measurement entity, comprising:

performing a carrier phase measurement associated with a reference signal for positioning (RS-P) measurement for a position estimation of a user equipment (UE);

determining error information associated with the carrier phase measurement, wherein the error information comprises an aggregate error associated with the carrier phase measurement;

transmitting the RS-P measurement to a position estimation entity;

transmitting the carrier phase measurement and an indication of the error information to the position estimation entity; and associating the aggregate error with one of a set of carrier phase error groups (CPEGs), wherein the indication indicates the associated CPEG, wherein each CPEG in the set of CPEGs is associated with a different error profile, and wherein the aggregate error matches the error profile of the associated CPEG.

2. The method of claim 1, wherein the error profile for each CPEG in the set of CPEGs is defined based on error mean, error variance, a higher order statistic, a distribution model, an integer level indicator, or any combination thereof.

3. The method of claim 1, wherein the indication comprises a CPEG identifier (ID) of the CPEG.

4. The method of claim 1, further comprising:

transmitting a CPEG capability associated with the wireless measurement entity to the position estimation entity, wherein the CPEG is requested for carrier phase measurement reporting by the position estimation entity based on the CPEG capability.

5. The method of claim 1, wherein the RS-P measurement comprises an angle of arrival (AoA) measurement or an angle of departure (AoD) measurement.

6. The method of claim 1, further comprising:

receiving location assistance data that is based on carrier phase error information reported by the wireless measurement entity, one or more other wireless measurement entities, or a combination thereof.

7. The method of claim 1, wherein the indication of the error information is transmitted in the same measurement report as the RS-P measurement.

8. The method of claim 1, wherein the indication of the error information is transmitted in a first measurement report and the RS-P measurement is transmitted in a second measurement report, and wherein the first measurement report comprises a timestamp or subframe identifier or slot identifier of an RS-P occasion associated with the RS-P measurement.

9. A method of operating a position estimation entity, comprising:

receiving a reference signal for positioning (RS-P) measurement for a position estimation of a user equipment (UE);

receiving a carrier phase measurement associated with the RS-P measurement and an indication of error information associated with the carrier phase measurement, wherein the error information comprises an aggregate error associated with the carrier phase measurement, wherein the indication indicates one of a set of carrier phase error groups (CPEGs), wherein each CPEG in the set of CPEGs is associated with a different error profile, and wherein the aggregate error matches the error profile of the associated CPEG; and determining a position estimation of the UE based on the RS-P measurement, the carrier phase measurement, and the indication of the error information.

10. The method of claim 9, wherein the error profile for each CPEG in the set of CPEGs is defined based on error mean, error variance, a higher order statistic, a distribution model, an integer level indicator, or any combination thereof.

11. The method of claim 9, wherein the indication comprises a CPEG identifier (ID) of the CPEG.

12. The method of claim 9, further comprising:
receiving a CPEG capability associated with a wireless measurement entity from which the RS-P measurement is received; and
requesting the CPEG for carrier phase measurement reporting based on the CPEG capability.

13. The method of claim 9,
wherein the indication of the error information is received in the same measurement report as the RS-P measurement, or
wherein the indication of the error information is received in a first measurement report and the RS-P measurement is received in a second measurement report, and the first measurement report comprises a timestamp or subframe identifier or slot identifier of an RS-P occasion associated with the RS-P measurement.

14. A wireless measurement entity, comprising:
at least one memory; and
at least one processor communicatively coupled to the at least one memory, the at least one processor configured to:
perform a carrier phase measurement associated with a reference signal for positioning (RS-P) measurement for a position estimation of a user equipment (UE);
determine error information associated with the carrier phase measurement, wherein the error information comprises an aggregate error associated with the carrier phase measurement;
transmit the RS-P measurement to a position estimation entity;
transmit the carrier phase measurement and an indication of the error information to the position estimation entity; and
associate the aggregate error with one of a set of carrier phase error groups (CPEGs),
wherein the indication indicates the associated CPEG,
wherein each CPEG in the set of CPEGs is associated with a different error profile, and
wherein the aggregate error matches the error profile of the associated CPEG.

15. A position estimation entity, comprising:
at least one memory; and
at least one processor communicatively coupled to the at least one memory, the at least one processor configured to:
receive a reference signal for positioning (RS-P) measurement for a position estimation of a user equipment (UE);
receive a carrier phase measurement associated with the RS-P measurement and an indication of error information associated with the carrier phase measurement, wherein the error information comprises an aggregate error associated with the carrier phase measurement, wherein the indication indicates one of a set of carrier phase error groups (CPEGs), wherein each CPEG in the set of CPEGs is associated with a different error profile, and wherein the aggregate error matches the error profile of the associated CPEG; and
determine a position estimation of the UE based on the RS-P measurement, the carrier phase measurement, and the indication of the error information.

* * * * *